United States Patent
Zongker

(10) Patent No.: US 10,055,216 B2
(45) Date of Patent: *Aug. 21, 2018

(54) MINIMIZING IMAGE COPYING DURING PARTITION UPDATES

(71) Applicant: Google LLC, Mountain View, CA (US)

(72) Inventor: Douglas Earl Zongker, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,570

(22) Filed: May 31, 2017

(65) Prior Publication Data

US 2017/0262276 A1    Sep. 14, 2017

Related U.S. Application Data

(63) Continuation of application No. 14/528,973, filed on Oct. 30, 2014, now Pat. No. 9,778,926.

(51) Int. Cl.
*G06F 9/44* (2018.01)
*G06F 9/445* (2018.01)
(Continued)

(52) U.S. Cl.
CPC .............. *G06F 8/65* (2013.01); *G06F 8/63* (2013.01); *G06F 8/658* (2018.02);
(Continued)

(58) Field of Classification Search
CPC ..... G06F 8/60; G06F 8/61; G06F 8/65; G06F 8/67
See application file for complete search history.

(56) References Cited

U.S. PATENT DOCUMENTS

| 6,018,747 A | 1/2000 | Burns et al. |
| 6,775,423 B2 | 8/2004 | Kulkarni et al. |

(Continued)

FOREIGN PATENT DOCUMENTS

| EP | 2 428 891 A1 | 3/2012 |
| EP | 1 855 197 B1 | 12/2012 |

OTHER PUBLICATIONS

Sadeghi et al., "Ensuring the Consistency of Adaptation through Inter- and Intra-Component Dependency Analysis", ACM, May 2017, pp. 2:1-2:27; <https://dl.acm.org/citation.cfm?id=3063385>.*

(Continued)

*Primary Examiner* — Thuy Dao
*Assistant Examiner* — Ben C Wang
(74) *Attorney, Agent, or Firm* — McDonnell Boehnen Hulbert & Berghoff LLP

(57) ABSTRACT

Apparatus and methods for updating binary images are described. A computing device can determine transfers for updating a binary source image to become a binary target image. A transfer can include a source memory reference for the source image and a target memory reference for the target image. The computing device can determine a graph based on ordering dependencies between the transfers. The graph can include vertices for the transfers with edges between vertices. The computing device can generate an edge from a first vertex for a first transfer to a second vertex for a second transfer, with the first transfer to be performed before the second transfer. The computing device can break any cycles present in the graph to obtain an acyclic graph. The computing device can order the transfers based on the acyclic graph and send the ordered transfers in an update package for the source image.

20 Claims, 10 Drawing Sheets

(51) Int. Cl.
*G06F 8/65* (2018.01)
*G06F 17/30* (2006.01)
*G06F 8/658* (2018.01)
*G06F 8/60* (2018.01)
*G06F 8/656* (2018.01)
*G06F 8/61* (2018.01)

(52) U.S. Cl.
CPC .......... *G06F 17/30958* (2013.01); *G06F 8/60* (2013.01); *G06F 8/61* (2013.01); *G06F 8/656* (2018.02)

(56) References Cited

U.S. PATENT DOCUMENTS

| | | | |
|---|---|---|---|
| 7,210,010 B2 | 4/2007 | Ogle | |
| 7,886,041 B2* | 2/2011 | Outhred | G06F 8/65 703/21 |
| 8,336,044 B2 | 12/2012 | Wang et al. | |
| 8,898,676 B2 | 11/2014 | Hiltgen et al. | |
| 9,176,732 B2 | 11/2015 | Chakraborty et al. | |
| 9,262,143 B2* | 2/2016 | Karve | G06F 8/60 |
| 9,323,644 B1* | 4/2016 | Hale | G06F 8/433 |
| 9,652,485 B1* | 5/2017 | Bhargava | G06F 17/30356 |
| 9,778,926 B2* | 10/2017 | Zongker | G06F 8/65 |
| 2003/0050932 A1 | 3/2003 | Pace et al. | |
| 2007/0106980 A1 | 5/2007 | Felts | |
| 2007/0113225 A1 | 5/2007 | Felts | |
| 2007/0294364 A1* | 12/2007 | Mohindra | G06F 8/61 709/217 |
| 2007/0294420 A1 | 12/2007 | Mohindra et al. | |
| 2007/0294668 A1 | 12/2007 | Mohindra et al. | |
| 2009/0144720 A1* | 6/2009 | Roush | G06F 8/65 717/171 |
| 2009/0164982 A1 | 6/2009 | Lobo et al. | |
| 2010/0281456 A1 | 11/2010 | Eizenman et al. | |
| 2012/0084393 A1 | 4/2012 | Williams et al. | |
| 2012/0089485 A1* | 4/2012 | Williams | G06F 8/61 705/26.61 |
| 2012/0089971 A1* | 4/2012 | Williams | G06F 8/61 717/167 |
| 2012/0144380 A1 | 6/2012 | Rabeler et al. | |
| 2013/0055247 A1 | 2/2013 | Hiltgen et al. | |
| 2013/0332647 A1 | 12/2013 | Rabeler et al. | |
| 2015/0067644 A1 | 3/2015 | Chakraborty et al. | |
| 2015/0154086 A1 | 6/2015 | Rabeler et al. | |
| 2015/0227363 A1* | 8/2015 | Pillgram-Larsen | G06F 11/3664 717/122 |
| 2016/0012473 A1* | 1/2016 | Zegal | G06Q 30/0245 705/14.19 |
| 2016/0124739 A1* | 5/2016 | Zongker | G06F 8/65 717/172 |
| 2017/0026227 A1* | 1/2017 | Lian | H04L 41/0668 |
| 2017/0036444 A1* | 2/2017 | Kihara | B41J 2/1623 |
| 2018/0088929 A1* | 3/2018 | Eberlein | G06F 8/70 |

OTHER PUBLICATIONS

Kula et al., "Modeling Library Dependencies and Updates in Large Software Repository Universes", The Journal of Systems and Software, Sep. 2017, pp. 1-30; <https://arxiv.org/pdf/1709.04626.pdf>.*

Kula et al., "A Generalized Model for Visualizing Library Popularity, Adoption, and Diffusion within a Software Ecosystem", IEEE, Mar. 2018, pp. 288-299; <https://ieeexplore.ieee.org/document/8330217/>.*

Catuogno et al., "Guaranteeing Dependency Enforcement in Software Updates", Oct. 2015, Springer, NordSEc 2015, LNCS 9417, pp. 205-212; available via the Internet at link.springer.com/chapter/10.1007/978-3-319-26502-5_15.

Cox et al, "Measuring Dependency Freshness in Software Systems", May 2015 IEEE, ICSE'15, pp. 109-118; available via the Internet at ieeexplore.ieee.org/stamp/stamp jsp?arnumber=7202955.

P. Eades et al., "A Fast & Effective Heuristic for the Feedback Arc Set Problem", Information Processing Letters, Oct. 18, 1993, pp. 319-323, vol. 47, Issue 6.

P. Eades et al., "A Heuristic for the Feedback Arc Set Problem", Australasian Journal of Combinatorics, Sep. 1995, pp. 15-25, vol. 12.

D. Korn et al., "RFC 3284—The VCDIFF Generic Differencing and Compression Data Format", Jun. 2002, 29 pages.

Lee et al, "Function Matching-based Binary-Level Software Similarity Calculation", ACM, BACS'13, Oct. 2013, pp. 322-327; available via the Internet at dl.acm.org/citation.cfm?id=2513300&CFID=761601880&CFTOKEN=98351379.

C. Percival, "Binary diff/patch utility", Jul. 6, 2006, available via the Internet at www.daemonology.net/bsdiff/.

C. Percival, "Matching with Mismatches and Assorted Applications", 2006, Ph.D. Thesis, Oxford University.

C. Percival, "Naive Differences of Executable Code", 2003, available via the Internet at www.daemonology.net/papers/bsdiff.pdf.

S.Skiena, "1.5.11 Feedback Edge/Vertex Set", Jul. 10, 2008, available via the Internet at www3.cs.stonybrook.edu/~algorith/files/feedback-set.shtml.

Wikimedia Foundation, "xdelta", May 26, 2014, available via the Internet at en.wikipedia.org/w/index.php.title=Xdelta&oldid=610153988.

D. E. Zongker, "imgdiff.c", Aug. 20, 2012, Android Open Source Project, available via the Internet at android.googlesource.com/plafform/bootable/recovery/+/master/applypatch/imgdiff.c.

* cited by examiner

SM
320

| | |
|---|---|
| d1/no_change | 100-109 |
| d2/change | 110-119 |
| d3/grow | 120-129 |
| d3/shrink | 130-149 |
| d4/P1 | 150-159 |
| d4/P2 | 160-169 |
| d4/P3 | 170-184 |

SI 500

| Loc | |
|---|---|
| 100 | d1/no_change |
| 110 | d2/change |
| 120 | d3/grow |
| 130 | |
| 140 | d3/shrink |
| 150 | |
| 160 | d4/P1 |
| 170 | d4/P2 |
| 184 | d4/P3 |

TM
420

| | |
|---|---|
| d1/no_change | 100-109 |
| d2/change | 110-119 |
| d3/grow | 120-139 |
| d3/shrink | 140-149 |
| d4/P1_oP2 | 150-159 |
| d4/P2_oP3 | 160-169 |
| d4/P3_oP1 | 170-179 |
| d5/new_nz | 180-189 |
| d5/new_zero | 190-204 |

TI 510

| Loc | |
|---|---|
| 100 | d1/no_change |
| 110 | d2/change |
| 120 | d3/grow |
| 130 | |
| 140 | d3/shrink |
| 150 | |
| 160 | d4/P1_oP2 |
| 170 | d4/P2_oP3 |
| 180 | d4/P3_oP1 |
| 190 | d5/new_nz |
| 204 | d5/new_zero |

List L1
600

| Tran | Type | SrcRange | TgtRange | DiffApp | AuxData |
|---|---|---|---|---|---|
| A | Move | 100-109 | 100-109 | -- | -- |
| B | Diff | 110-119 | 110-119 | bsdiff | patch_chg |
| C | Diff | 120-129 | 120-139 | bsdiff | patch_grw |
| D | Diff | 130-149 | 140-149 | imgdiff | p1shr,p2shr |
| E | Diff | 150-159 | 170-179 | bsdiff | patch_P3oP1 |
| F | Diff | 160-169 | 150-159 | bsdiff | patch_P1oP2 |
| G | Diff | 170-184 | 160-169 | bsdiff | patch_P2oP3 |
| H | New | --- | 180-189 | -- | nz_data |
| I | Zero | --- | 190-204 | -- | -- |

300 ⇘

MINIMIZING IMAGE COPYING DURING PARTITION UPDATES

CROSS-REFERENCE TO RELATED APPLICATIONS

This application is a continuation of U.S. patent application Ser. No. 14/528,943, filed Oct. 30, 2014, entitled "Minimizing Image Copying During Partition Updates", the contents of which are fully incorporated by reference herein for all purposes.

BACKGROUND

Unless otherwise indicated herein, the materials described in this section are not prior art to the claims in this application and are not admitted to be prior art by inclusion in this section.

Many modern devices utilize computing devices and related software for their operation. From time to time, and for a variety of reasons, the related software may be updated after purchase and installation of such devices. The related software can be updated using one or more software "patches" or updates that can be applied to a source image, or un-updated version of the related software. When the patches are applied on the device, the source image is transformed into the target image, which includes fixes and/or new features not present in the original source image. Patches can be provided using a variety of techniques, including downloading from a software provider's website, using off-line storage holding the patches (e.g., flash drives, CDs, magnetic media), and/or via data entry of commands and/or portions of the related software.

SUMMARY

In one aspect, a method is provided. A software update server determines a plurality of transfers that are configured to update a binary source image to become a binary target image. At least one transfer of the plurality of transfers includes a source reference to one or more source memory locations storing the source image and a target reference to one or more target memory locations for the target image. The software update server determines a dependency graph based on the plurality of transfers. The dependency graph includes a plurality of edges and a plurality of vertices corresponding to the plurality of transfers, with each edge in the plurality of edges is from a first-executed vertex to a second-executed vertex, where the first-executed vertex represents a first-executed transfer to be performed before a second-executed transfer represented by the second-executed vertex. The software update server determines whether there are one or more cycles in the dependency graph. After determining that there are one or more cycles in the dependency graph, the software update server modifies the dependency graph to be an acyclic dependency graph by breaking the one or more cycles. The software update server orders the plurality of transfers based on the acyclic dependency graph. The software update server sends the ordered plurality of transfers.

In another aspect, a computing device can be provided. The computing device includes one or more processors and data storage. The data storage is configured to store at least computer-readable program instructions. The instructions are configured to, upon execution by the one or more processors, cause the computing device to perform functions. The functions include: determining a plurality of transfers that are configured to update a binary source image to become a binary target image, where at least one transfer of the plurality of transfers includes a source reference to one or more source memory locations storing the source image and a target reference to one or more target memory locations for the target image; determining a dependency graph based on the plurality of transfers, where the dependency graph includes a plurality of edges and a plurality of vertices corresponding to the plurality of transfers, each edge in the plurality of edges is from a first-executed vertex to a second-executed vertex, and where the first-executed vertex represents a first-executed transfer to be performed before a second-executed transfer represented by the second-executed vertex; determining whether there are one or more cycles in the dependency graph; after determining that there are one or more cycles in the dependency graph, modifying the dependency graph to be an acyclic dependency graph by breaking the one or more cycles; ordering the plurality of transfers based on the acyclic dependency graph; and sending the ordered plurality of transfers.

In another aspect, an article of manufacture is provided. The article of manufacture includes a computer-readable storage medium that has instructions stored thereon that, in response to execution by one or more processors, cause the one or more processors to perform functions. The functions include: determining a plurality of transfers that are configured to update a binary source image to become a binary target image, where at least one transfer of the plurality of transfers includes a source reference to one or more source memory locations storing the source image and a target reference to one or more target memory locations for the target image; determining a dependency graph based on the plurality of transfers, where the dependency graph includes a plurality of edges and a plurality of vertices corresponding to the plurality of transfers, each edge in the plurality of edges is from a first-executed vertex to a second-executed vertex, and where the first-executed vertex represents a first-executed transfer to be performed before a second-executed transfer represented by the second-executed vertex; determining whether there are one or more cycles in the dependency graph; after determining that there are one or more cycles in the dependency graph, modifying the dependency graph to be an acyclic dependency graph by breaking the one or more cycles; ordering the plurality of transfers based on the acyclic dependency graph; and sending the ordered plurality of transfers.

In another aspect, a computing device is provided. The computing device includes: means for determining a plurality of transfers that are configured to update a binary source image to become a binary target image, where at least one transfer of the plurality of transfers includes a source reference to one or more source memory locations storing the source image and a target reference to one or more target memory locations for the target image; means for determining a dependency graph based on the plurality of transfers, where the dependency graph includes a plurality of edges and a plurality of vertices corresponding to the plurality of transfers, each edge in the plurality of edges is from a first-executed vertex to a second-executed vertex, and where the first-executed vertex represents a first-executed transfer to be performed before a second-executed transfer represented by the second-executed vertex; means for determining whether there are one or more cycles in the dependency graph; means for, after determining that there are one or more cycles in the dependency graph, modifying the dependency graph to be an acyclic dependency graph by breaking the one or more cycles; means for ordering the plurality of transfers based on the acyclic dependency graph; and means for sending the ordered plurality of transfers.

BRIEF DESCRIPTION OF THE FIGURES

FIG. 5 depicts a source image related to the source map for the scenario and a target image related to the target map for the scenario, in accordance with an example embodiment.

DETAILED DESCRIPTION

Figure 1A:
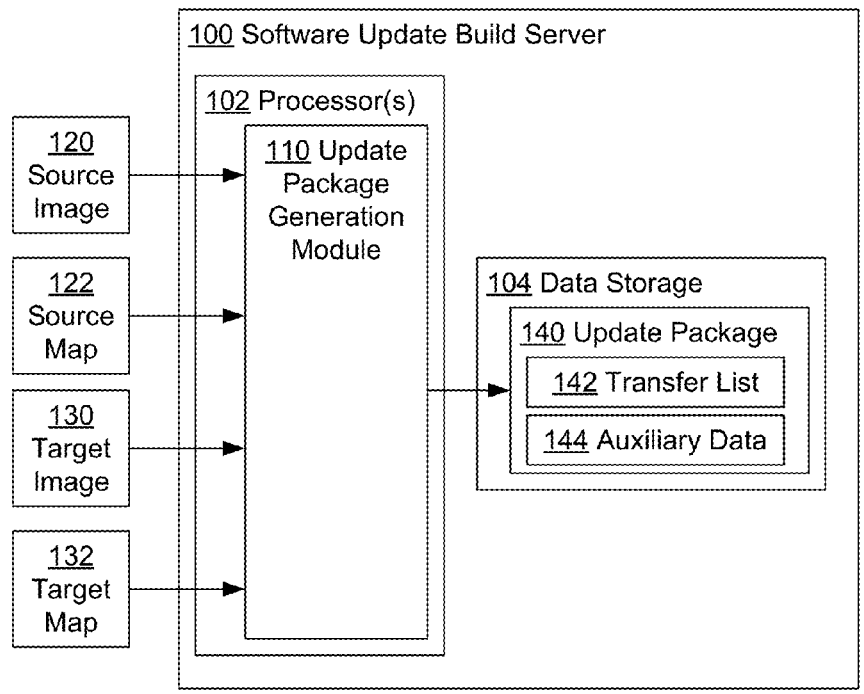
FIG. 1A is a diagram of a software update server, in accordance with an example embodiment.

Many modern devices include one or more processors that execute software that is stored as an image stored in one or more files. The image can be a partial or complete copy of the contents and/or structure of a storage device. Such an image can be stored in memory of a device. The image can include software for an operating system and/or other software usable to operate the device. For example, a flash memory device or other storage device can have a partition, or file system structure, that contains a target image of an operating system for a mobile device or other computing device.

From time to time, the partition can be updated to fix software bugs, to add new functionality, and perhaps other reasons. When an image in the partition is to be updated, information to update a source (or current) image to a target (or new) image can be provided to the device via an external storage device, one or more downloadable files, and/or using other communications techniques.

The source image resident on the device and the target image can have many similarities, such as files of the images that are identical or only have slight differences between source and target images. To update the software, an update package can be provided to the device, where the update package can include difference data representing changes between source and target images. As update packages can be smaller than target images, providing update packages can reduce the data to be provided (e.g., downloaded) to the device to update a source image.

In some cases, the device does not have enough storage to store both source and target images at the same time. Then, an in-place update of the source image can be used to generate the target image without duplicating or otherwise copying the source image as part of creating the target image. The in-place update can include overwriting parts of the source image with data for the target image. As the target image is regenerated from difference data in the update package, an in-place update only stores one image copy.

One technique for generating update packages can utilize a source set of labeled domains that partition the source image and a target set of labeled domains that partition the target image. For the specific case of file system images, a labeled domain can correspond to one or more files where a label for the domain can be a pathname (or other name) for a particular file and the domain can be or represent storage for the particular file; e.g., a domain can be a set of data blocks, sectors, addresses, or other information related to memory locations storing data for the particular file. In some cases, an additional domain; e.g., a leftover domain, can refer to storage of portions of an image that do not correspond to particular file(s). For example, the leftover domain can include a set of memory locations used to store file system data, such as inode tables and directory entries.

For each domain in the target image, a domain label and/or other information can be used to find a corresponding domain of the source image. For example, a domain D1 of the source image can correspond to a domain D2 in the target image, when a label, memory location, and/or other information about D1 is determined to be closest to information about domain D2. When D1 is a closest domain to D2, a patch needed to transform D1 into D2 into the other is likely to include a relatively small amount of difference data.

After matching source and target domains, a transfer list with one or more transfers can be generated. A transfer can be one or more instructions regarding where to obtain source data from a source image, possibly apply a patch to the source data, and write the resulting target data to the target image. In some cases, individual domains are relatively small, and so a binary patching tool can be used to generate and/or apply patches on a per-domain basis.

There may be ordering dependencies between transfers. For example, consider three transfers:

Transfer A: read source locations 100-150, apply a patch, write target locations 200-250.

Transfer B: read source locations 230-280, apply a patch, write target locations 300-350.

Transfer C: read source locations 325-375, apply a patch, write target locations 125-199.

In this example, Transfers A, B, and C are applied in-place. If Transfer A is performed first, the transfer would overwrite some of the locations that Transfer B uses as input; specifically, locations 230-250 written to by Transfer A and then read by Transfer B. Transfer B would then either fail or produce incorrect output. In this example, correct output can be produced only if Transfer B is executed before Transfer A, as no source locations are read by Transfer A that were written to as target locations by Transfer B. As Transfer B has to be executed before Transfer A to ensure correctness of all of Transfers A, B, and C, Transfer A can be said to have an ordering dependency on Transfer B to ensure correctness.

A graph representing a set of transfers can be generated. For example, each transfer can be represented as a vertex of the directed graph. In the directed graph, an edge can be generated from vertex U to vertex V only if the transfer corresponding to vertex U must be executed before the transfer corresponding to vertex V. Using the example Transfers A, B, and C above, three directed edges in the directed graph can be drawn:

Edge (1) from a vertex B (representing Transfer B) to a vertex A (representing Transfer A) to indicate Transfer B has to occur before Transfer A, Edge (2) from a vertex C (representing Transfer C) to vertex B to indicate Transfer C has to occur before Transfer B, and Edge (3) from vertex A to vertex C to indicate Transfer A has to occur before Transfer C.

Some directed graphs have cycles, which is a sequence of vertices that begin and end at the same vertex such that, there is an edge between each two consecutive vertices of the cycle with the edge directed from the earlier vertex to the later one. In the example directed graph representing Transfers A, B, C mentioned above, there is a cycle {B, A, C, B} starting with vertex B, proceeding to vertex A via Edge (1), then proceeding to vertex C via Edge (3), and returning to vertex B via Edge (2).

If the directed graph is acyclic (does not have cycles), a global ordering of the transfers can be determined that satisfies all ordering dependencies among transfers. However, a cycle in the directed graph indicates there is no order for carrying out the transfers represented by the cycle that satisfies all ordering dependencies among transfers.

Some of the ordering dependencies between transfers in a cycle can be removed or modified to break cycles in the directed graph representing the transfers. However, to produce efficient overall patches, the number of ordering dependencies to be removed and/or modified should be limited as much as feasible. The problem of removing the least number of edges from a directed graph to make the graph acyclic is called the minimum feedback arc set problem, which is an NP-complete problem.

To approximate a solution of the minimum feedback arc set problem, a heuristic can be applied to produce an ordering of the transfers that satisfies as many of the ordering dependencies as feasible. To continue the example above, suppose that the heuristic indicates that Transfers A, B, and C above should be performed in the order: Transfer A, Transfer C, Transfer B. This order satisfies two constraints (Transfer A before Transfer C corresponding to Edge (3) and Transfer C before Transfer B corresponding to Edge (2)) but violates the third (Transfer B before Transfer A corresponding to Edge (1)).

In general, directed graph G may have one or more cycles. A directed graph with cycles can be transformed to an acyclic graph by removing and/or reversing edges that represent ordering dependencies. Once an acyclic version of graph G can be determined, an acyclic G can be topologically sorted, and a resulting ordering of vertices of G can be used to order transfers so that no ordering dependencies are violated. As there is a one-to-one mapping between vertices in G and transfers, an ordering of vertices in G, such as ordering O1, corresponds to an ordering of transfers. In the context of the transfers, the ordering of transfers indicates that a transfer T1 at position P1 in the ordering does not interfere with transfers whose positions in the ordering exceed P1. Once an ordering of the transfers is determined based on graph G, an update package provided to a device can include (a) a list of transfers to be carried out in a sequence as specified by the ordering of the transfers and (b) auxiliary data, such as patch data, needed for transfers in the list of transfers.

The herein-described techniques for updating images are based on observations that a system image is structured and similar domain names in system images often connote similar content, even the domains are in different places within the image. That allows for representing a system image as a set of named (target or source) domains for locating files within the system image. By reconstructing a target image in-place, a large target image can be exactly reproduced even if the device does not have enough storage to hold a second image. As an update package for a system image can include a number of independent patches to individual domains, multiprocessing can be used to compute patches in parallel to build the update package. Thus, the herein-described techniques can be used to generate update packages in parallel, speeding generation of such update packages. The generated update packages can be provided to devices, which can apply update packages exactly duplicate target images in-place, and so reduce storage utilized in updating system images.

Example Techniques and Apparatus for Updating Software Images

FIG. 1A is a diagram of software update build server 100, in accordance with an example embodiment. Software update build server 100 can be a computing device, such as a computing device discussed below in the context of FIGS. 13A and 13B. FIG. 1A shows software update build server 100 having one or more processors 102 and data storage 104. One or more processors 102 of software update build server 100 can execute software, such as update package generation module 110. In some embodiments, data storage 104 can store some or all machine-executable instructions of the software for update package generation module 110, and perhaps other machine-executable instructions.

Update package generation module 110 can receive several inputs; as shown in FIG. 1A, update package generation module 110 can receive source image 120, source map 122, target image 130, and target map 132 as inputs. Source image 120 and target image 130 can be respective images each representing a file system or other structure storing executable software, such as system images representing storage of at least part of an operating system and/or other system software for a computing device. For example, source image 120 can be a current image in use by a device, and target image 130 can be a new, updated image for the device.

In some embodiments, source image 120 can contain the information in source map 122, and so source map 122 is not separately input to software update build server 100 and/or update package generation module 110. In other embodiments, target image 130 can contain the information in target map 132, and so target map 132 is not separately input to software update build server 100 and/or update package generation module 110. In particular embodiments, software update build server 100 and update package generation module 110 receive only two inputs: source image 120 and target image 130, and generate source map 122 from source image 120 and generate target map 132 from target image 130.

Source map 122 and target map 132 can each contain one or more identifiers, references, or other information configured to identify one or more portions of respective source image 120 and target image 130. For example, source map 122 and target map 132 can be lists or other structures of pathnames, file names, and/or other identifiers for files used to build source image 120 and target image 130, respectively.

To enable a computing device to update source image 120 to target image 130, update package generation module 110 can generate update package 140. In some embodiments, the update from source image 120 to target image 130 can be an in-place update of source image 120.

As shown in FIG. 1A, update package 140 can be stored in data storage 104 and can include transfer list 142 and auxiliary data 144. Transfer list 142 can be a list or other structure that specifies one or more transfers of data from source image 120 to target image 130. Some or all of the transfers can involve application of additional data found in auxiliary data 144. For example, a transfer in transfer list 142 can refer to one or more patches in auxiliary data 144 that, when applied to data from source image 120, change the data from source image 120 to data for target image 130. If update package 140 represents an in-place transfer, then the data for target image 130 can be written back to source image 120, and so transform source image 120 to become target image 130 after update package 140 has been completely applied on a device.

Figure 1B:
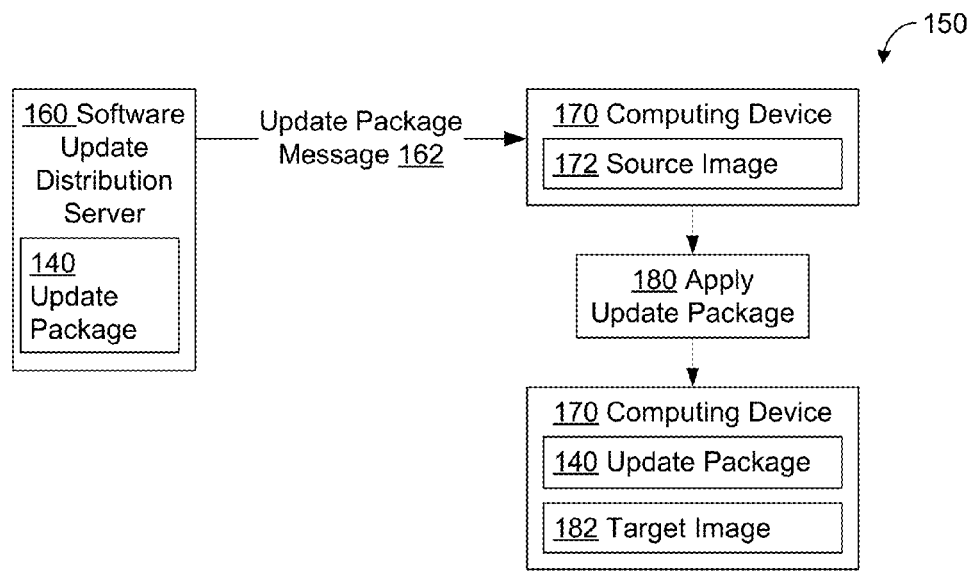
FIG. 1B depicts a scenario for distribution and application of an update package, in accordance with an example embodiment.

FIG. 1B depicts scenario 150 for distribution and application of update package 140, in accordance with an example embodiment. Prior to the onset of scenario 150, software update distribution server 160 receives update package 140 from software update build server 100. In some scenarios, software update build server 100 can act as software update distribution server 160; while in other scenarios, including scenario 150, software update distribution server 160 can be a different software update server than software update build server 100.

At the onset of scenario 150, software update distribution server 160 stores update package 140. Scenario 150 continues with software update distribution server 160 sending update package message 162 to computing device 170, where update package message 162 includes a copy of update package 140. Computing device 170 can be a computing device such as discussed below in the context of FIGS. 13A and 13B. In some examples, computing device 170 can be a wearable and/or mobile computing device; while in other examples, computing device 170 can be a stationary computing device.

FIG. 1B shows that computing device 170 includes source image 172. In scenario 150, source image 172 which is identical to source image 120. Upon reception of update package message 162, computing device 170 can obtain the copy of update package 140 from update package message 162. At lower right of FIG. 1B, computing device 170 is shown applying 180 update package 140 to update source image 172 in-place to become target image 182. In scenario 150, as source image 172 is identical to source image 120, then after the in-place update, target image 182 is identical to target image 130. Therefore, software update distribution server 160 can send a copy of update package 140 to distribute target image 130 to devices that already have source image 120. As shown in FIG. 1B, computing device 170 has enough storage to hold update package 140 and one image, which in scenario 150 is less storage than would be required to store two images; e.g., both source image 172 and target image 182.

After applying update package 140, computing device 170 can delete update package 140. For example, update package 140 can include instructions for self-deletion upon successful application. After target image 182 is obtained by computing device 170, computing device 170 may be partially or completely reinitialized; e.g., rebooted, to load and execute target image 182.

Example Method for Generating Update Packages

Figure 2:
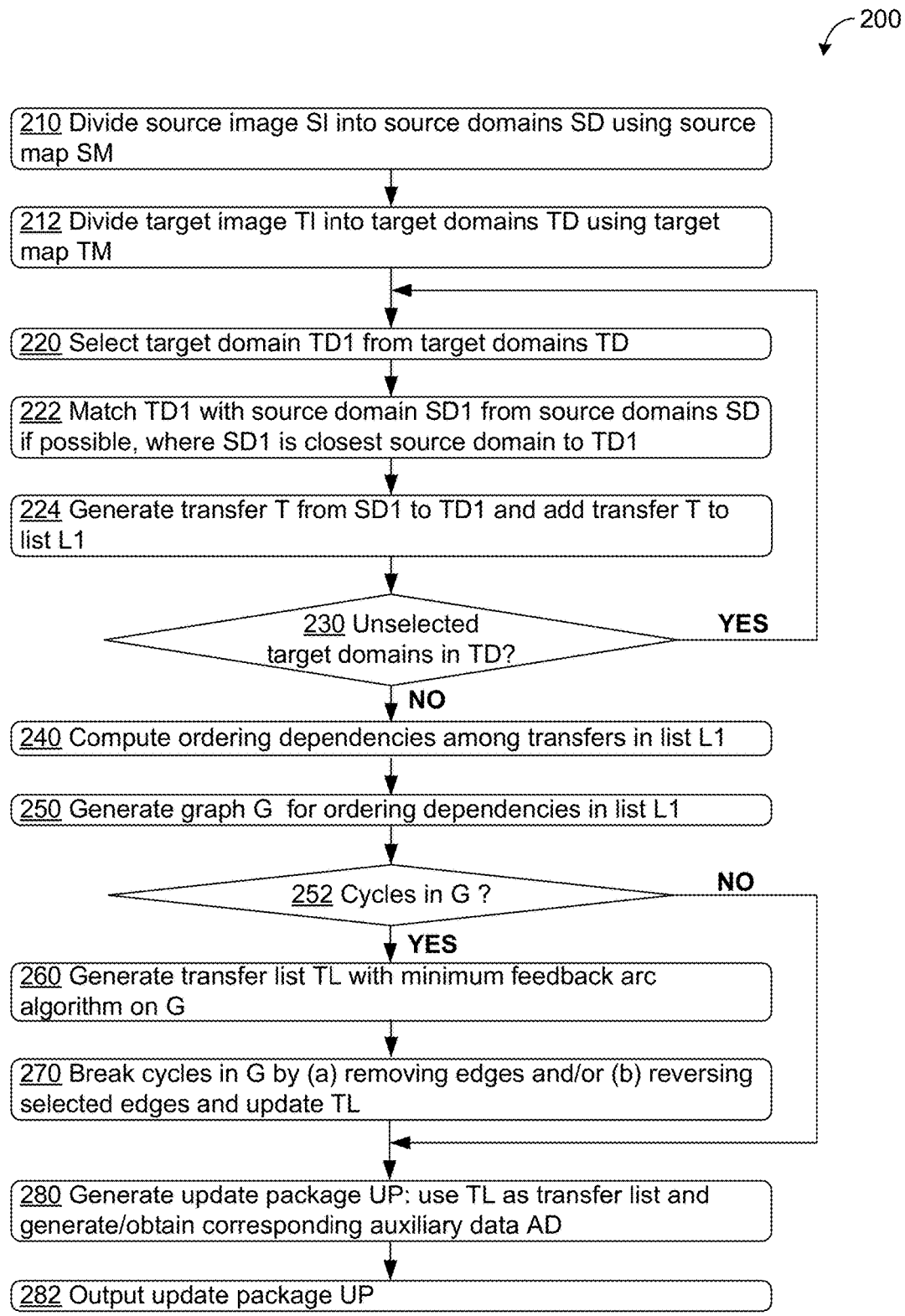
FIG. 2 is a flowchart of an example method, in accordance with an example embodiment.

FIG. 2 is a flowchart of method 200, in accordance with an example embodiment. Method 200 can be used to generate and output an update package UP, such as update package 140 discussed above in the context of FIGS. 1A and 1B. Method 200 can be performed by software executing on a computing device CD; e.g., update package generation module 110 executing on software update build server 100.

In some embodiments, update package UP can be downloaded or otherwise communicated to a device; e.g., computing device 170. In some examples, the device can have a memory partition containing a source image and can use update package UP to transform the memory partition to contain a target image instead. In particular of these examples, the device does not have enough memory for multiple copies of the source image, so update package UP can update the partition in-place. In some embodiments, update package UP can be generated to be as small as possible, to minimize both transmission time taken to provide update package UP to the device and memory used to store update package UP.

Method 200 can be based on several inputs. These inputs can include source image SI, source map SM, target image TI, and target map TM. For examples, source image SI, source map SM, target image TI, and target map TM can be, respectively, source image 120, source map 122, target image 130, and target map 132 discussed above in the context of FIG. 1A.

In some examples, source image SI and target image TI can each be large files (at least 1 gigabyte in size). In other examples, source image SI and target image TI can be images of file systems. In these examples, source map SM and target map TM can be lists, or other structures, containing information about what files and corresponding locations of the files contained in the file systems respectively imaged by source image SI and target image.

Method 200 can begin at block 210, where computing device CD can divide source image SI into one or more non-overlapping source domains SD using source map SM. For example, each source domain in source domains SD can indicate a portion of the image corresponding to a file name (or other identifier) for a file used to build source image SI. In some cases, a file name can include a path used to reach the file; i.e., a path name can be used as a file name, where the file name represents a domain in an image. In this example, source map SM can be a list of files used to build source image SI.

At block 212, computing device CD can divide target image TI into one or more non-overlapping target domains TD using target map TM. For example, each target domain in target domains TD can indicate a portion of the image corresponding to a file name (or other identifier) for a file used to build target image TI. In this example, target map TM can be a list of file names of files used to build target image TI.

At block 220, computing device CD can select a target domain TD1 from one or more unselected target domains TD, and can indicate that TD1 has been selected.

At block 222, computing device CD can match target domain TD1 with a source domain SD1 of source domains SD, where SD1 is a closest domain to TD1. As an example of closeness matching of domains based on file names, an exact pathname match between D1 and D2 can be determined to be a closest match, a filename-only match between D1 and D2 can be determined to be a next-closest match, then, a match based on a pattern extracted from the filename can be utilized, then, if no match is yet found, a target domain can be considered to be entirely new data, where the new data can be provided in the update package as difference data.

In embodiments where source domains SD and target domains TDs are based on file names, computing device CD can match TD1 with source domains SD to find SD1, where SD1 is a file name that is the same or most similar to TD1 among source domains SD and where SD1 and TD1 are within a threshold amount of similarity; e.g., SD1 and TD1 are at least a 90% match on a per-character basis or SD1 and TD1 are at least a next-closest match as described immediately above. In some cases, it is not possible for computing device CD to find a match to TD1 in source domains SD; e.g., TD1 represents a new domain of target image TI. In such cases where no matching source domain SD1 is found, computing device CD can assign source domain SD1 to a value representing an empty domain, such as null or zero.

In other embodiments, data about components used to generate a source and/or destination domain; e.g., makefiles or other compilation controls can be used to identify source data used to generate a file of a source and/or target domain. For example, suppose a makefile SMF used to generate a source image indicates that object files foo.o and bar.o were utilized to generate a source image file blah1. Then, in the example, suppose another makefile TMF used to generate a target image indicates that object files foo.o and bar.o were utilized to generate a target image file super_blah. Then, by determining that foo.o and bar.o were used to generate blah1 of the source image and super_blah in the target image, a source-image domain representing blah1 can be matched with a target-image domain representing super_blah. Many other techniques for matching domains are possible are well.

At block 224, computing device CD can generate a transfer related to TD1, and add the generated transfer to list L1. A transfer can represent some or all of the following set of operations to be performed on an image; e.g., source image SI being updated in-place to target image TI: (a) if SD1 is not set to a null/default value, read source data from specified source locations of the image that correspond to at least a portion of source domain SD1; (b) combine the source data with auxiliary data to produce target data, and (c) write the target data to specified target locations of the image that correspond to target domain TD1.

Different types of transfers are possible. In some embodiments, at least four types of transfers can be utilized—move, diff, new, and zero transfers. A move transfer can read source data from a source range of locations and write the source data to a target range of locations. The following shows example range formats for source ranges and target ranges:

//format of source_range (for all operations):
//[source_ref] begin loc end loc [, [source_ref] begin_loc end_loc . . . ]]
//format of target_range (for all operations):
//[target_ref] begin loc end loc [, [target_ref] begin_loc end_loc . . . ]]
//default source_ref and target_ref for first pair of locations="image"
//default source_ref and target_ref for later pairs of locations=last specified reference In some embodiments, both source ranges and target ranges can use a range format. For examples of the range format:

- a range "100 109" can specify ten locations 100 to 109 inclusive in the image.
- a range of "100 109, 130 139" specifies twenty locations of data in the image: ten locations from 100 to 109 inclusive followed by ten locations 130 to 139 inclusive.
- a range of "200 214, T 0 11" specifies twenty-seven locations of data: fifteen locations 200 to 214 inclusive from the image followed by twelve locations 0 to 11 inclusive from storage named T; e.g., temporary storage.
- a range of "T 0 11, 14 18" specifies seventeen locations of data from storage named T: twelve locations 0 to 11 inclusive followed by five locations 14 to 18 inclusive.
- a range of "T 0 11, image 14 18" specifies seventeen locations of data: twelve locations 0 to 11 inclusive from storage named T followed by five locations 14 to 18 inclusive from the image
- a range of "100 110, T1 0 3, T2 0 1, 5 10", specifies twenty-three locations of data: eleven locations 100 to 110 inclusive from the image, four locations 0 to 3 inclusive from storage named T 1, followed by eight locations from storage named T2—two locations 0 and 1, and six locations 5 to 10 inclusive.

Many other example uses of a range format are possible for specifying source ranges, target ranges, and/or other types of ranges.

A move transfer can read source data from a source range of source locations corresponding to source domain SD1 and write the source data unchanged to (another) specified target range of target locations corresponding to target domain TD1. As data for source domain SD1 and target domain TD1 are identical during a move transfer, auxiliary data for the move transfer can be empty or unspecified. In some embodiments, a move transfer can involve reading the source data from the source locations and write the source data unchanged to the target locations. For example, a move transfer to read locations 100 to 110 from the image and write those locations to locations 200 to 210 of the image can be specified as:

//format: move from source_range to target_range
move from 100 110 to 200 210

As another example, the following example operation can be used move twenty total locations of source data from locations 200 to 210 and 214 to 222 in the image to locations 100 to 119 of temporary storage called "T1":

move from 200 210, 214 222 to T1 100 119

A diff transfer can read source data from a specified source range corresponding to source domain SD1, modify the source data to generate target data, and write the target data to specified target locations of the image corresponding to target domain TD1. For example, if source domain SD1 and target domain TD1 contain similar data, computing device CD can execute a binary differencing algorithm (e.g., bsdiff, imgdiff, xdelta3/VCDIFF) to generate a patch. The patch can be applied to the source data to create the target data. In some examples, patch sizes decrease as similarity between the source data and the target data increase. The patch becomes (part of) the auxiliary data for this transfer. Then, modifying the source data to generate the target data can involve applying the patch. For example, a diff transfer to read source data of locations 100 to 110 from the image, apply the patch named "p1" to the source data to generate target data and write the target data to locations 200 to 220 of the image can be specified as:

//format: diff from source_range to target_range patch
diff from 100 110 to 200 220 p1

Different binary differencing algorithms can be selected; e.g., based on the type of source data and/or target data. In some embodiments, diff transfers can use a "patch" value that specifies a binary differencing algorithm to be used to generate a patch; e.g., bsdiff, imgdiff. For example, a patch value of "bsdiff p3" indicates use of the bsdiff algorithm to apply a patch and/or other auxiliary data named "p3". In other embodiments, multiple types of diff transfers can be utilized, with one type of transfer per binary differencing algorithm to be utilized. For example, if two different binary differencing algorithms are utilized, such as bsdiff and imgdiff, then transfers named "bsdiff" and "imgdiff" can be supported. In still other embodiments, a patch value can us a default binary differencing algorithm if one is not specified; e.g., use the bsdiff algorithm by default.

In some embodiments, a diff transfer can obtain source data from other locations in a source image. For example, source data can be stored in temporary storage and so the diff transfer can be applied to data obtained from temporary storage. An example of such a diff transfer, classified as a "diffT" transfer is shown below:

//format: diffT from source_range to target_range patch
diffT from temp100 0 9 to 200 220 bsdiff p1

In the example diffT operation above, 10 locations of data indexed from location 0 to location 9 are read from temporary storage named "temp100" to obtain source data. Then, a patch "p1" is applied using the "bsdiff" binary differencing algorithm to update the source data and then the updated data are written as target data to locations 200 to 220 of the image. In other embodiments, the diff operation can read data from temporary storage, and so a separate diffT operation may not be utilized.

Temporary storage can also be written to as well; e.g., the example writeT operation below writes locations 0 to 9 from storage named B2 to temporary storage named temp150, and then locations 0 to 4 from the image are appended to temp150 using an example appendT operation:

//format: writeT from source_range to target_range that specifies temporary storage writeT from B2 0 9 to temp150
//format: appendT from source_range to target_range that specifies temporary storage appendT from 0 4 to temp150

In some embodiments, write and append operations that can write to any target range, in contrast to writeT and appendT being restricted to writing to temporary storage, are possible as well. Many other operations utilizing temporary storage are possible as well.

A new transfer can involve writing new data to target locations of the image. In some cases, a new transfer does not include specification of source locations; e.g., a source domain SD1 corresponding to target domain TD1 was not found. In these cases, there are no source data to be read and, instead, auxiliary data for the transfer can contain the target data to be written to the target locations of the image. For example, a new transfer to read target data from auxiliary data named "p2" and write the target data to locations 300 to 311 of the image can be specified as:

//format: new from auxdata to target_range,
//auxdata format: aux_ref [start_loc end_loc[, auxdata]],
//with aux_ref referring to auxiliary data
new from p2 to 300 311

A zero transfer can be a special case of a new transfer, where the target data is all zeroes. In this case we need any source data or auxiliary data; we just write zeroes to each byte in the image specified by the target locations of the image. In some embodiments, a zero transfer can write a specified pattern of one or more bytes repeatedly to the target locations. For examples, zero transfers that write zeroes to target locations 400 to 410 of an image and write the pattern "0x626c6168" to locations 411 to 414 of the image can be specified as //format: zero [from pattern] to target_range, with default pattern=0x0
zero to 400 410
//the above transfer could also be specified as: zero from 0x0 to 400 410
zero from 0x626c6168 to 411 414

In these example specifications of new transfers, a default pattern of "0x0" can be used in a zero transfer. In other embodiments, other default patterns; e.g., 0x1, 0xff, etc. could be used in a transfer that repetitively writes a default pattern to a range of image locations, such as the zero transfer.

At block 230, computing device CD can determine whether there are unselected domains in target domains TD. If target domains of TD are unselected, method 200 can proceed to block 220. Otherwise, all target domains in TD have been selected, and method 200 can proceed to block 240.

At block 240, computing device CD can use the list L1 of transfers to determine information about ordering dependencies among transfers. Suppose list L1 contains information about two transfers: a transfer T3 wants to write a given target location B1, and another transfer T4 wants to read location B1 as a source location. Then, transfer T4 has to be ordered to precede transfer T3; otherwise, transfer T3 will have overwritten location B1 that transfer T4 reads as a source location.

To compute inter-transfer ordering dependencies, computing device CD can determine overlaps between source locations and target locations of transfers in L1. Locations that are read by one transfer and written to by another transfer can be called overlapping locations. Specifically, an overlap between source locations SL1 for transfer T1 and target locations TL1 for transfer T2 can exist if some or all of source locations SL1 are also target locations TL1. In this example, transfers T1 and T2 can be said to be overlapping transfers.

At block 250, computing device CD can determine represent list L1 and the information about ordering dependencies as directed graph G. For example, each transfer in list L1 can be represented as a vertex of G, and an edge in G can be constructed from vertex U to vertex V if the ordering information indicates that corresponding transfer U should precede transfer V.

For example, consider three transfers:
Transfer A: read source locations 100-150, apply a patch, write target locations 200-250.
Transfer B: read source locations 230-280, apply a patch, write target locations 300-350.
Transfer C: read source locations 325-375, apply a patch, write target locations 125-199.

In this example, Transfers A, B, and C are applied in-place. If Transfer A is performed first, the transfer would overwrite some of the locations that Transfer B uses as input; specifically, locations 230-250 written to by Transfer A and then read by Transfer B. Transfer B would then either fail or produce incorrect output.

In this example, correct output can be produced only if Transfer B is executed before Transfer A, as no source locations are read by Transfer A that were written to as target locations by Transfer B. Similar ordering dependencies exist so that, for correctness's sake, Transfer C has to occur before Transfer B (as locations 325-350 have to be read for Transfer C before being written by Transfer B) and Transfer A has to occur before Transfer C (as locations 100-125 have to be read for Transfer A before being written by Transfer C). For in-place updates, the data in the target image can include the set of target data after all transfers have been applied plus the set of data in the source image left unaltered by all the transfers.

Using the example Transfers A, B, and C above, three directed edges in the directed graph G can be drawn:
- Edge (1) from a vertex B (representing Transfer B) to a vertex A (representing Transfer A) to indicate Transfer B has to occur before Transfer A,
- Edge (2) from a vertex C (representing Transfer C) to vertex B to indicate Transfer C has to occur before Transfer B, and
- Edge (3) from vertex A to vertex C to indicate Transfer A has to occur before Transfer C.

At block 252, computing device CD can determine whether there are any cycles in G. For example, computing device CD can use a cycle-detection algorithm to detect any cycles in G. A cycle in G represents a circular chain of transfers that need to go before one other, i.e., B must go before A, A must go before C, and C must go before B. Further, if the directed graph is acyclic (i.e., that is, if the directed graph does not have cycles), a global ordering of the transfers can be determined that satisfies all ordering dependencies among transfers.

Using the example directed graph representing Transfers A, B, C mentioned above with respect to block 250, there is a cycle leading from vertex B to vertex A via Edge (1), from vertex A to vertex C via Edge (3), and from vertex C back to vertex B via Edge (2). Graphically, this cycle can be represented as B→A→C→B . . . . In this example, this cycle in G corresponds to the ordering dependencies among corresponding Transfers A, B, and C that cannot all be satisfied.

At block 252, if G is acyclic, method 200 can proceed to 280. Otherwise, method 200 can proceed to block 260.

At block 260, a set of ordering constraints is selected for possible modification using a minimum feedback arc set algorithm. An example minimum feedback arc set algorithm outputs an order L for the vertexes of G that can satisfy most of the ordering constraints. In some embodiments, the minimum feedback arc set algorithm can attempt to minimize the count of edges (representing ordering dependencies) that are violated by the order L. In other embodiments, the minimum feedback arc set algorithm can attempt to minimize weights of assigned edges in the graph G. For example, each edge in graph G can be assigned a weight that corresponds to an estimated cost of violating an ordering dependency represented by the edge. In these embodiments, an ordering that violates two (or more) ordering dependencies represented by edges with respectively small weights in graph G may be preferred over an ordering that violates an ordering dependency represented by one edge with a respectively large weight. Then, graph G can be ordered by order L.

At block 270, computing device CD can break remaining cycles in G by eliminating and/or reversing edges that lead to the remaining cycles. A directed graph with cycles can be transformed to an acyclic graph by removing and/or reversing ordering dependencies. Since graph G is ordered by an order L that satisfies most, but not all, ordering dependencies that lead to cycles in G, computing device CD can modify transfers with ordering dependencies that correspond to the remaining cycles in G. To produce efficient overall patches, the number of ordering dependencies to be removed and/or modified should be limited as much as feasible.

At least two techniques can be used to modify transfers that lead to breaking cycles of G: modifying transfers to remove one or more ordering dependencies, which corresponds to removing an edge in the cycle, and modifying transfers to reverse one or more ordering dependencies, which corresponds to reversing an edge in the cycle.

The cycle of Transfers A, B, and C can be diagrammed as B→A→C→B . . . . This cycle can be broken if an edge of a cycle were reversed, such as Edge (1). After placing a reversed B←A edge to replace Edge (1), the above diagram looks like: B←A→C→B. The diagram illustrates that once the reversed edge replaces Edge (1) in the directed graph, the cycle is broken as there is no path from B to A.

To continue the example above, suppose that the minimum feedback arc set algorithm of block 260 indicates that Transfers A, B, and C and corresponding graph G mentioned with respect to blocks 250 and 252 should be performed in the order: Transfer A, Transfer C, Transfer B. This order satisfies two constraints (Transfer A before Transfer C corresponding to Edge (3) and Transfer C before Transfer B corresponding to Edge (2)) but violates the third (Transfer B before Transfer A corresponding to Edge (1)).

Then, to break the example cycle by removing an ordering dependency, Transfer B can be transformed into a new transfer, Transfer B1, with no ordering dependencies on Transfer A. To remove the ordering dependency between Transfers A and B, the new Transfer B1 can remove any source locations from Transfer B that overlap with Transfer A's target locations; e.g., Transfer B1: read source locations 251-280, apply a patch, write target locations 300-350.

By replacing vertex B with a vertex B1 representing Transfer B1, Edge (1) can be removed from the directed graph as there is no ordering dependency between A and B1. And removing Edge (1) breaks the cycle in the directed graph. A patch for Transfer B1 may be larger than a patch for Transfer B, as the B1 patch does not have access to the source data in locations 230-250. However, Transfer B1 can be executed after Transfer A, because Transfer B1 does not read any locations that were written to by Transfer A. So, ordering the transfers as A, C, B1 does not violate any remaining ordering dependencies and Transfers A, C, and B1 can safely be used in that order to generate the target image using an in-place update of the source image.

As mentioned above, another technique to break a cycle in a directed graph is to reverse an edge in the cycle. To reverse the edge, let Transfer A be replaced by Transfer A2, and let Transfer B be replaced by B2, where:

Transfer A2: save locations 230-250 in temporary space, read source locations 100-150, apply a patch, write to target locations 200-250.

Transfer B2: take the saved locations from temporary space as source locations, read and append locations 251-280 to the source locations, apply a patch, output to target locations 300-350.

Transfers A2 and B2 have a reverse ordering dependency compared to Transfer A and Transfer B. To produce correct output, Transfer A2 should precede Transfer B2, as Transfer A2 saves locations in temporary space that Transfer B2 expects to use. Thus, the B→A edge can be replaced by an edge A2→B2 edge to break the cycle. Other techniques for deciding whether to remove an edge or reverse an edge are possible as well; e.g., always reverse edges, always remove edges, select a technique based on an estimated or actual amount of time to apply patches.

At block 280, as graph G is acyclic, an ordering of transfers without ordering dependencies can be generated. For example, G can be ordered, such as via a topological sort, and each component of G traversed in order to generate a list of vertices reached during traversal. This list of vertices corresponds to a transfer list TL that is a global ordering of the transfers that satisfies all ordering dependencies among transfers.

For example, a topological sort can be performed on acyclic directed graph G to generate an ordering L2 of the vertices of G, where L2 is intended to minimize total temporary storage needed at any given time; i.e., temporary storage used by transfers to eliminate ordering constraints. In some embodiments, a greedy topological sort can be used to obtain ordering L2. When selecting vertices of G to add to L2, the greedy topological sort algorithm can choose as a next vertex Nmin that minimizes the temporary storage in use after a corresponding transfer Nmin executes. If there is a tie among vertices, the greedy topological sort algorithm can choose an arbitrary vertex to break the tie. Other techniques to obtain ordering L2 of the vertices of G are possible as well.

After obtaining ordering L2 of vertices in G, the update package UP can be generated with transfer list TL and auxiliary data AD, where transfer list TL is a list of transfers that corresponds to the vertices in order L2, and where auxiliary data AD contains any necessary data; e.g., patch data, used to perform the transfers in transfer list TL.

At block 282, update package UP can be output. In some embodiments, method 200 can end after carrying out block 282.

Example Scenario for Generating an Update Package

Scenario 300 is a scenario where a computing device CD1 generates and transmits an update package using the techniques of method 200 discussed above in the context of FIG. 2. For example, computing device CD1 can include one or more servers, such as software update build server 100 and/or software update distribution server 160, discussed above. Aspects of scenario 300 are depicted by and discussed herein with reference to FIGS. 3-11.

Figure 3:
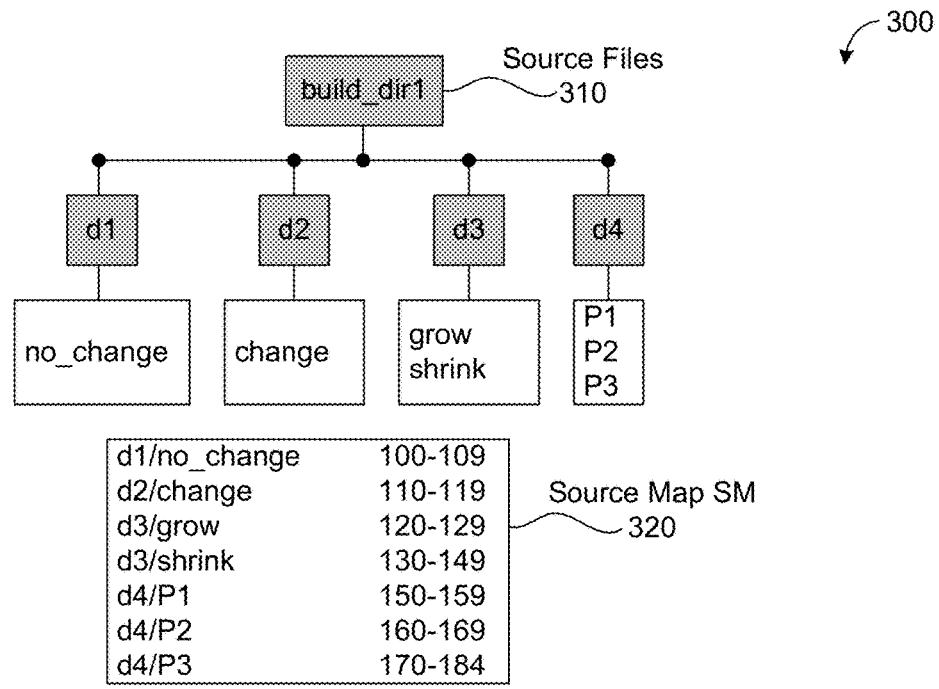
FIG. 3 depicts source files and a corresponding source map for a scenario, in accordance with an example embodiment.

FIG. 3 depicts source files 310 and corresponding source map SM 320 for scenario 300, in accordance with an example embodiment. FIG. 3 shows source files 310 in a directory structure with a root directory called "build_dir1", four subdirectories to the root directory respectively named "d1", "d2", "d3", and "d4", and files contained in each subdirectory. For example, d1 contains a file called "no_change", d2 contains a file called "change", d3 contains two files called "grow" and "shrink", and d4 contains three files called "P1", "P2", and "P3". In FIG. 3, names of directories and subdirectories are shown inside grey boxes and file names are shown inside of white boxes.

Source map SM 320 can be a list of file names and/or path names and corresponding storage locations, where the file names and/or path names are within a directory structure whose root directory is the root directory "build_dir1" of source files 310. For example, a first entry in source map 320 is "d1/no_change 100-109" which includes a path name "d1/no_change" to locate the "no_change" file starting at the "build_dir1" root directory and indicates the no_change file is stored in locations 100 to 109 inclusive. Similarly, source map 320 includes an entry "d2/change 110-119" to locate the "change" file stored in locations 110 to 119 inclusive, "d3/grow 120-129" and "d3/shrink 130-149" to locate and indicate storage used by the files in the "d3" subdirectory, and "d4/P1 150-159", "d4/P2 160-169", and "d4/P3 170-184" to locate and indicate storage used by the files in the "d4" subdirectory. As source map SM 320 lists path names to all files under the root directory (build_dir1), source map SM 320 can be used to specify and locate files placed under the root directory.

Figure 4:
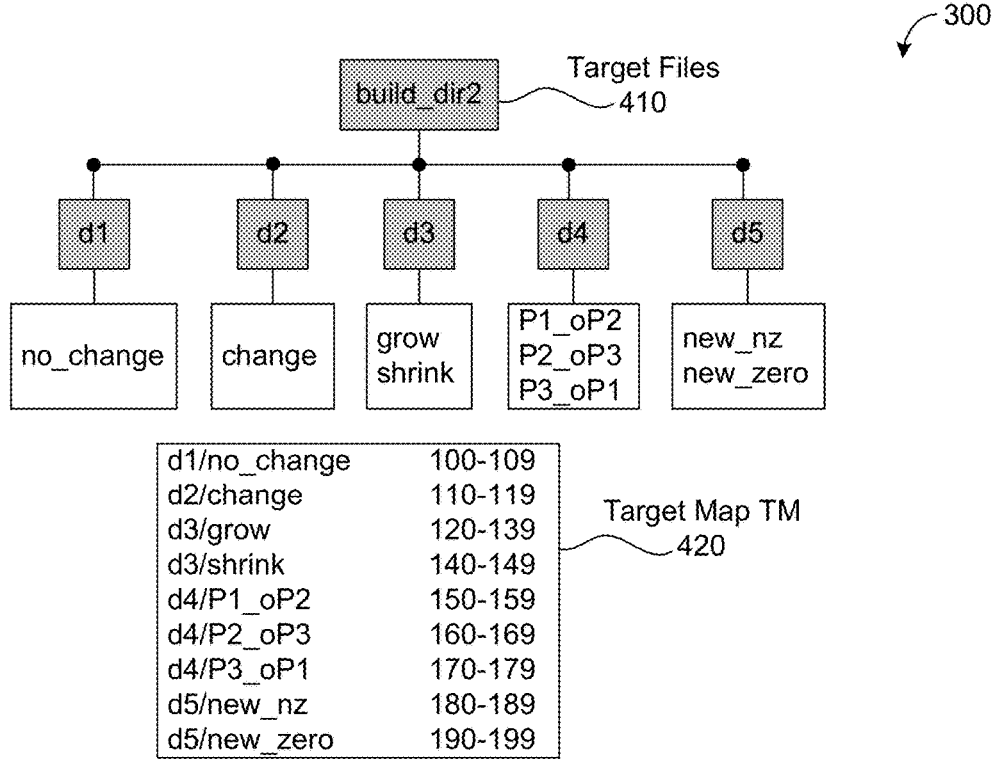
FIG. 4 depicts target files and a corresponding target map for the scenario, in accordance with an example embodiment.

FIG. 4 depicts target files 410 and corresponding target map TM 420 for scenario 300, in accordance with an example embodiment. Source files 410 are shown in a directory structure with a root directory called "build_dir2", five subdirectories to the root directory respectively named "d1", "d2", "d3", "d4", and "d5", and files contained in each subdirectory. For example, d1 contains a file called "no_change", d2 contains a file called "change", d3 contains two files called "grow" and "shrink", d4 contains three files called "P1_oP2", "P2_oP3", and "P3_oP1", and d5 contains files "new_nz" and "new_zero". In FIG. 4, names of directories and subdirectories are shown inside grey boxes and file names are shown inside of white boxes.

Target map TM 420 can be a list of file names and/or path names and corresponding storage locations, where the file names and/or path names are within a directory structure whose root directory is the root directory "build_dir2" of target files 410. For example, a first entry in target map 420 is "d1/no_change 100-109" which includes a path name "d1/no_change" to locate the "no_change" file starting at the "build_dir2" root directory and indicates the no_change file is stored in locations 100 to 109 inclusive. Similarly, target map 420 includes an entry "d2/change 110-119" to locate the "change" file stored in locations 110 to 119 inclusive, entries "d3/grow 120-139" and "d3/shrink 140-149" to locate and indicate storage used by the files in the "d3" subdirectory, entries "d4/P1_oP2 150-159", "d4/P2_oP3 160-169", and "d4/P3_oP1 170-179" to locate and indicate storage used by the files in the "d4" subdirectory, and entries "d5/new_nz 180-189" and "d5/new_zero 190-199" to locate and indicate storage used files in the "d5" subdirectory. As target map TM 420 lists path names to all files under the root directory (build_dir2), target map TM 420 can be used to specify and locate files placed under the root directory.

FIG. 5 depicts a source image SI 500 and target image TI 510 for scenario 300, in accordance with an example embodiment. Source image SI 500 can be related to source map SM 320 and target image TI 510 can be related to target map TM 420, in accordance with an example embodiment. In particular, source image SI 500 can be made up of a number of source domains, where each source domain in source image SI 500 holds the contents of one file listed in source map SM 320.

FIG. 5 shows that source image SI 500 of scenario 300 has seven domains, with each domain corresponding to one entry in source map SM 320. The domains of source image SI 500 include:

1. a domain with a range of memory locations (Loc) 100-109 for the d1/no_change file,
2. a domain with a range of memory locations 110-119 for the d2/change file,
3. a domain with a range of memory locations 120-129 for the d3/grow file, 4. a domain with a range of memory locations 130-149 for the d3/shrink file, 5. a domain with a range of memory locations 150-159 for the d4/P1 file, 6. a domain with a range of memory locations 160-179 for the d4/P2 file, and 7. a domain with a range of memory locations 170-184 for the d4/P3 file.

Similarly, target image TI 510 can be made up of a number of domains, where each domain in target image TI 510 corresponds to one entry of source map TM 420. In some embodiments, one domain in an image, such as source image SI 500 and/or target image TI 510, can hold the contents of multiple files and/or other structures (e.g., inode tables, directory entries). In other embodiments, multiple domains in an image, such as source image SI 500 and/or target image TI 510, can be used to hold the contents of one file or one other structure.

FIG. 5 shows that target image TI 510 of scenario 300 has nine domains, with each domain corresponding to one file specified by one pathname in target map TM 420. The domains of target image TI 510 include:

1. a domain with a range of memory locations 100-109 for the d1/no_change file, 2. a domain with a range of memory locations 110-119 for the d2/change file, 3. a domain with a range of memory locations 120-139 for the d3/grow file, 4. a domain with a range of memory locations 140-149 for the d3/shrink file, 5. a domain with a range of memory locations 150-159 for the d4/P1_oP2 file, 6. a domain with a range of memory locations 160-179 for the d4/P2_oP3 file, 7. a domain with a range of memory locations 170-179 for the d4/P3_oP1 file, 8. a domain with a range of memory locations 180-189 for the d5/new_nz file, and 9. a domain with a range of memory locations 190-204 for the d5/new_zero file.

Figures 6, 7:
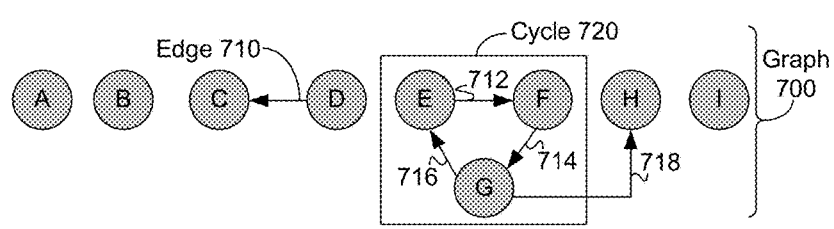
FIG. 6 depicts an example list related to transfers for the scenario, in accordance with an example embodiment.
FIG. 7 is an example graph indicating relationships between transfers of the scenario, in accordance with an example embodiment.

As also discussed above in the context of FIG. 2, computing device CD1 in scenario 300 can generate an ordered list of one or more transfers to update a copy of source image SI 500 to become a copy of target image TI 510. FIG. 6 depicts example list L1 600 of transfers for scenario 300, in accordance with an example embodiment. List L1 600 lists nine transfers A, B, C, D, E, F, G, H, and I that can be used to update a copy of source image SI 500 to become a copy of target image TI 510.

FIG. 6 shows that Transfer A of list L1 600 is a "Move" transfer for copying the d1/no_change file. As a move transfer, Transfer A reads data from source image SI 500 stored in the source_range of locations, specified in FIG. 6 as "SrcRange" with values "100-109" indicating a starting location of 100 and ending location of 109 for the source_range. As shown in FIG. 5, the source_range locations 100 to 109 of source image SI 500 are a domain that stores the contents of the d1/no_change file. Then, as a move transfer, Transfer A writes the data read from the source_range of locations to a target_range of locations in target image TI 510, where the target_range is specified in FIG. 6 as "TgtRange" with values "100-109" indicating a starting location of 100 and ending location of 109 for the target_range. That is, Transfer A involves reading data; e.g., the d1/no_change file, from locations 100 to 109 of source image SI 500, and writing the read-in data to locations 100 to 109 of target image TI 510.

In scenario 300, the transfers in list L1 600 are used for an in-place update of source image SI 500 to target image TI 510. Then, Transfer A would not be needed in scenario 300 as the data read from locations 100 to 109 is not altered before being written to the same locations (locations 100 to 109). In other scenarios where separate copies of source image SI 500 and target image TI 510 are utilized, Transfer A can be used to effectively copy the d1/no_change file without alteration from source image SI 500 to target image TI 510.

FIG. 6 shows that Transfer B of list L1 600 is a "Diff" transfer for updating the d2/change file. As a diff transfer, Transfer B reads data from a source_range of locations in source image SI 500 specified in FIG. 6 as a range of locations 110 to 119. As shown in FIG. 6, the source_range locations 110 to 119 in source image SI 500 are a domain that stores the contents of the d2/change file. Then, as a diff transfer, Transfer B updates the data read in from source image SI 500 using auxiliary data, shown in FIG. 6 as "patch_chg", to generate updated data. The resulting updated data can be written to a target range of locations in target image TI 510, shown in FIG. 6 as a range of locations 110-119. That is, Transfer B involves reading data; e.g., the d2/change file, from locations 110 to 119 of source image SI 500, applying auxiliary data patch_chg to generate updated data, and writing the updated data to locations 110 to 119 of target image TI 510.

FIG. 6 shows that Transfer C of list L1 600 is a "Diff" transfer for updating the d3/grow file. Transfer C initially reads data from a source_range of locations in source image SI 500 specified in FIG. 6 as a range of locations 120 to 129, which are a domain that stores the contents of the d3/grow file. Then, as a diff transfer, Transfer C updates the data read in from source image SI 500 using auxiliary data, shown in FIG. 6 as "patch_grw", to generate updated data. The resulting updated data can be written to target_range of locations 120-139 in target image TI 510. That is, Transfer C involves reading data; e.g., the d3/grow file, from locations 120 to 139 of source image SI 500, applying auxiliary data patch_grw to generate updated data, and writing the updated data to locations 120 to 139 of target image TI 510. In the example of Transfer C, the target domain is larger than the source domain, and so Transfer C will write more data to target image TI 510 than was read in from source image SI 500.

FIG. 6 shows that Transfer D of list L1 600 is a "Diff" transfer for updating the d3/shrink file. Transfer D initially reads data from a source_range of locations in source image SI 500 specified in FIG. 6 as a range of locations 130 to 149, which are a domain that stores the contents of the d3/shrink file. Then, as a diff transfer, Transfer D updates the data read in from source image SI 500 using auxiliary data, shown in FIG. 6 as "p1shr" and "p2shr", to generate updated data. In the case of Transfer D, two patches p1shr and p2shr are applied to update the source data. The resulting updated data can be written to target_range of locations 140-149 in target image TI 510. That is, Transfer D involves reading data; e.g., the d3/shrink file, from locations 130 to 149 of source image SI 500, applying auxiliary data p1shr and p2shr to generate updated data, and writing the updated data to locations 140 to 149 of target image TI 510. In the example of Transfer D, the target domain is smaller than the source domain, and so Transfer D will write less data to target image TI 510 than was read in from source image SI 500.

In other scenarios, patches p1shr and p2shr can be combined into one patch; e.g., patch_shr, and then the combined patch_shr applied to the source data. In some embodiments, patches p1shr and p2shr can be composed; that is, p1shr can be first applied to the source data to obtain updated data and then p2shr can be applied to the updated data after application of p1shr. In other embodiments, p1shr and p2shr can operate on separate portions of the source data, so that application of patches p1shr and p2shr can involve concatenation of target data resulting from applying p1shr to one of the separate portions of source data with target data resulting from applying p2shr to another of the separate portions of source data (or vice versa). In these embodiments, the separate portions of data can be specified; e.g., p1shr is applicable to locations 130-138 and p2shr is applicable to locations 139-149. In specific of these embodiments, the separate portions of data can exclude some locations—the excluded locations can then be left unaltered by application both patches; e.g., p1shr is applicable to locations 130-138, p2shr is applicable to locations 143-149, and so locations 139-142 are left unaltered.

In still other embodiments, p2shr can be applied first to patch p1shr to lead to an updated patch "p1shr*" and then p1shr* can be applied to the source data to lead to resulting target data. In even other embodiments, p1shr can be applied first to p2hsr to lead to updated patch "p2shr*", which is then applied to the source data to result in the target data. In further embodiments, one or more specifications of how two (or more) patches are to be applied; e.g., using composition, using concatenation, using patch-on-patch application, specifying order(s) of patch application, and/or combinations thereof in List L1 600 are possible as well.

FIG. 6 shows list L1 600 having Transfers E, F, and G that are each "Diff" transfers similar to Transfer B. Transfer E involves reading data; e.g., the d4/P1 file, from locations 150 to 159 of source image SI 500, applying auxiliary data "patch_P3oP1" to generate updated data, and writing the updated data to locations 170 to 179 of target image TI 510. Transfer F involves reading data; e.g., the d4/P2 file, from locations 160 to 169 of source image SI 500, applying auxiliary data "patch_P1oP2" to generate updated data, and writing the updated data to locations 150 to 159 of target image TI 510. Transfer G involves reading data; e.g., the d4/P3 file, from locations 170 to 184 of source image SI 500, applying auxiliary data "patch_P2oP3" to generate updated data, and writing the updated data to locations 160 to 169 of target image TI 510.

Each of Transfers E, F, and G change data locations between source and target images. Transfer E reads source data from source locations 150 to 159, generates corresponding updated data, and writes its updated data down to target locations 170 to 179. Transfer F reads source data from source locations 160 to 169, generates corresponding updated data, and writes its updated data up to target locations 150 to 159. And Transfer G reads source data from source locations 170 to 184, generates corresponding updated data, and writes its updated data up to target locations 160 to 169.

FIG. 6 shows that Transfer H of list L1 600 is a "New" transfer for creating the d5/new_nz file. As a new transfer, Transfer H obtains target data from auxiliary data "nz_data" specified as part of Transfer H. For example, Transfer H can include reading the target data from nz_data and/or executing software that is part of nz_data that generates the target data. Other techniques for obtaining target data from auxiliary data are possible as well.

After obtaining the target data, the target data is written to a target range of locations 180 to 189 (as indicated in FIG. 6) of target image TI 510. As shown in FIG. 5, the target range locations 180 to 189 of target image TI 510 are a domain that stores the contents of the d5/new_nz file. That is, Transfer H involves obtaining target data from auxiliary data; e.g., nz_data, and writing the target data to locations 180 to 189 of target image TI 510 to occupy a new domain corresponding to the d5/new_nz file.

FIG. 6 shows that Transfer I of list L1 600 is a "Zero" transfer for creating the d5/new_zero file. As a zero transfer, Transfer I generates target data by writing zeros (e.g., 0x0) to a target_range of locations. FIG. 6 shows that the target_range of locations for Transfer I is 190 to 204 of target image TI 510, which correspond to a domain that stores the contents of the d5/new_zero file. That is, Transfer H involves writing zeros to locations 190 to 204 of target image TI 510 to occupy a new domain corresponding to the d5/new_zero file. In other scenarios, many other transfers can be part of a list of transfers, such as list L1 600.

FIG. 7 shows graph 700 indicating relationships between transfers shown in list L1 600 of scenario 300, in accordance with an example embodiment. Graph 700 is a directed graph; that is, each edge between vertices of graph 700 has a specified direction. Each vertex of graph 700 corresponds to a transfer in list L1 600. That is, Transfers A through I in list L1 600 correspond to respective vertices A through I in graph 700.

An edge is drawn from a vertex V1 to another vertex V2 of graph 700 if ordering information for corresponding transfers V1, V2 in list L1 600 indicates that corresponding transfer V1 should precede transfer V2. As an example of an ordering dependency, Transfer D involves reading from memory locations 130-149 of an image and transfer C involves writing to memory locations 120-139; therefore, both Transfers C and D operate on memory locations 130-139. Generally speaking, reading memory locations from a source image should occur before writing to memory locations to generate a target image, so that a transfer reading in data can operate on unaltered data. Then Transfer D should precede Transfer C so that Transfer D can read memory locations 130-139 before Transfer C writes to memory locations 130-139. This ordering dependency is represented in graph 700 with edge 710 from vertex D to vertex C.

Similarly, Transfer E should precede Transfer F so that Transfer E can read memory locations 150-159 before Transfer F writes to those same memory locations 150-159—this ordering dependency is represented by edge 712 of graph 700. Also, Transfer F should precede Transfer G so that Transfer F can read memory locations 160-169 before Transfer G writes to those same memory locations, as represented by edge 714 of graph 700. Further, Transfer G should precede Transfers E and H so that Transfer G can read memory locations 170-184 before each of Transfers E and H writes to some of those same memory locations, as Transfer E writes to locations 170-179 and Transfer H writes to locations 180-189.

The ordering dependencies between respective Transfers G and E and Transfers G and H are respectively represented by edges 716 and 718 of graph 700. Together, vertices E, F, and G, and edges 712, 714, 716 form cycle 720 in graph 700, illustrated in FIG. 7 using a box for cycle 720 surrounding vertices E, F, and G, as well as edges 712, 714, and 716.

Figure 8A:
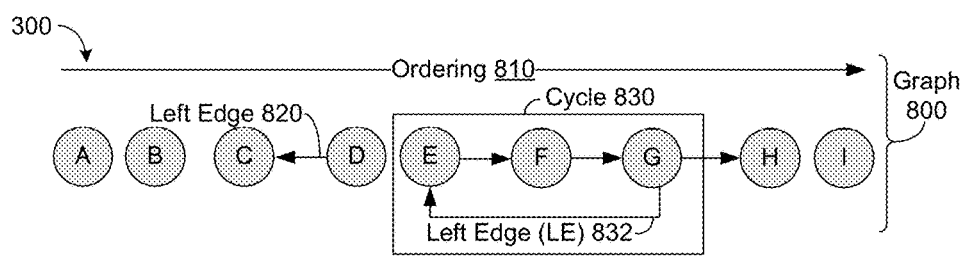
FIG. 8A shows an ordered version of the graph of FIG. 7, in accordance with an example embodiment.

FIG. 8A shows graph 800, which is graph 700 reordered by ordering 810, in accordance with an example embodiment. Ordering 810 of scenario 300 is an alphabetical ordering of vertices in graph 700, and imposing ordering 810 on graph 700 leads to graph 800. Graph 800 has both left edges, such as left edges 820 and 832, that are directed to the left, and right edges, such as edges from vertex E to vertex F, from vertex F to vertex G, and from vertex G to vertex H, that are directed to the right. FIG. 8A shows that ordering 810 goes from left to right, indicating positions in ordering 810 increase from left to right; e.g., vertex A is at a lower position than vertex B, and so on.

Cycles between two or more vertices include both left and right edges. For example, cycle 830 of graph 800 has two right edges (one right edge from vertex E to vertex F, and another right edge from vertex F to vertex G) and left edge 832. If two or more vertices are connected by directed edge(s) in only one direction; e.g., either left edges or right edges, then there are no cycles in the sequence. Let sequence S={V1, V2, V3 ... Vn} of n vertices, n>1, exist, where only right (left) edges exists between vertices in S. Then, vertex V1 has a position in ordering 810 that is less (more) than V2, V2 has a position in ordering 810 that is less (more) than V3, and so on, so that V1 has a position in ordering 810 that is less (more) than in position Vn. An edge from Vn to V1 would be needed to complete a cycle among all vertices in S. However, since Vn is higher (lower) in ordering 810 than V1, a left (right) edge would be needed to travel from Vn to V1 (from V1 to Vn). But, as only right (left) edges connect the vertices of S, the left (right) edge Vn to V1 (V1 to Vn) is not present, and so a cycle cannot be completed.

Therefore, if edges of only one direction are present in a graph, no cycles are present. As such, edges of one direction, either left or right, can be changed to break any cycles in graph 800. In scenario 300, left edges are examined to break cycles in graph 800—therefore, if graph 800 can be modified so that left edges 820 and 832 are either reversed to be right edges or deleted, then such a modified version of graph 800 would not have any cycles.

Figure 8B:
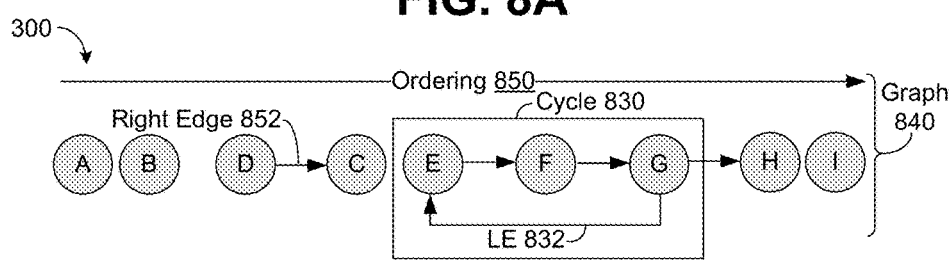
FIG. 8B shows a reordered version of the graph of FIG. 8A, in accordance with an example embodiment.

FIG. 8B shows graph 840, which is a reordered version of the graph of FIG. 8A, in accordance with an example embodiment. In graph 800, only one edge is associated with either vertex C or vertex D: left edge 820 from vertex D to vertex C. As edges of only one direction exist between vertices C and D, no cycle is present between vertices C and D. Then, ordering 850 can be used to order graph 800, where ordering 850 is the same as ordering 810 except that vertices C and D are reversed. Reversing the order of vertices C and D converts left edge 820 of graph 800 to right edge 852. Therefore, graph 840 has only left edge 832 remaining.

Left edge 832 is an edge from vertex G to vertex E. Vertex E has a right edge to vertex F, and vertex F has a right edge to vertex G. Therefore, as both left and right edges are associated with a sequence of vertices S1={E, F, G}, a cycle may be present among some or all of vertices {E, F, G} in graph 840. And, as FIG. 8B illustrates, cycle 830 does exist for sequence S1.

A cycle in a directed graph can be broken by deleting an edge in the cycle or by reversing an edge of the cycle. In scenario 300, left edge 832 is considered for both deletion and reversal. To break cycle 830 by removing an edge representing an ordering dependency, Transfer G can be transformed into a new transfer, Transfer G1, where any source locations from Transfer G1 that overlap with E's target locations are removed from Transfer G1. Transfer G1 can be executed after Transfer E, because Transfer G1 does not read any locations that were written to by Transfer E, and so there are no ordering dependencies between Transfers E and G1. Ordering the transfers in S1 as E, F, G1, H does not violate any remaining ordering dependencies. Therefore, Transfers E, F, G1, and H can safely be used to generate the target image using an in-place update of the source image. A new vertex G1 can be inserted into graph 840 but, as there is no ordering dependency between Transfers E and G1, no edge from G1 to E is to be added to graph 840, therefore effectively deleting left edge 832 from vertex G to vertex E.

As discussed above in the context of FIG. 6, Transfers E, G, and H perform the following actions:
  Diff Transfer E: read source data from locations 150 to 159, apply patch_P3oP1 to source data and obtain target data, write target data to locations 170 to 179
  Diff Transfer G: read source data from locations 170 to 184, apply patch_P2oP3 to source data and obtain target data, write target data to locations 160 to 169
  New Transfer H: obtain target data from auxiliary data nz_data and write target data to locations 180 to 189

For a replacement Transfer G1, source locations from Transfer G1 that overlap with Transfer E's target locations are to be removed. Transfer G uses locations 170 to 184 as source locations, while Transfer E uses locations 170 to 179 as target locations. Therefore, to modify Transfer G to not use locations 170 to 179 as source locations, the auxiliary data associated with Transfer G; e.g., patch_P2oP3, can be modified to include any/all data needed from locations 170 to 179 used to carry out Transfer G1. In scenario 300, the modified auxiliary data for Transfer G1 is called "new_patch_P2oP3". Then, the following example Transfer G1 can replace Transfer G:
  Diff Transfer G1: obtain source data from locations 180 to 184, apply new_patch_P2oP3 to the source data to obtain target data, and write target data to locations 160 to 169

Figure 9A:
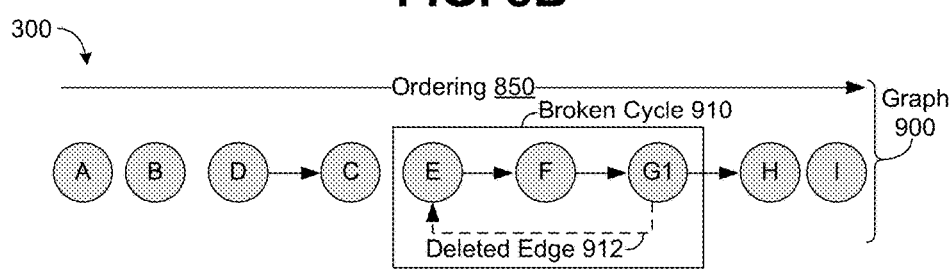
FIG. 9A depicts a revision of the graph of FIG. 8B due to cycle edge deletion and a transfer list, in accordance with an example embodiment.

FIG. 9A depicts graph 900, which is a revision of the graph of FIG. 8B due to cycle edge deletion, and a corresponding transfer list, in accordance with an example embodiment. Graph 900 is based on graph 840, with vertex G replaced by vertex G1, where vertex G1 represents Transfer G1 discussed immediately above. As Transfer G1 does not use source data that is written by Transfer G or Transfer H, the dependency leading to left edge 832 of graph 840 is no longer present in broken cycle 910 of FIG. 9A, and so left edge 832 of graph 840 has been deleted, as depicted in FIG. 9A using deleted edge 912.

In other embodiments, all references to source locations for a replacement Transfer G1' (or at least the source locations that overlap with another transfer, such as Transfer G or Transfer H) can be removed. Transfer G uses locations 170 to 184 as source locations. Therefore, to modify Transfer G to not use source locations, the auxiliary data associated with Transfer G; e.g., patch_P2oP3, can be modified to include any/all data needed from locations 170 to 184 used to carry out Transfer G1'. In scenario 300, the modified auxiliary data for Transfer G1' is called "new_patch_P2oP3prime". Then, the following example Transfer G1' can replace Transfer G:
  New Transfer G1': obtain target data from new_patch_P2oP3prime and write target data to locations 160 to 169

Transfer G1' has been converted from a diff type of transfer to a new type of transfer, as Transfer G1' does not read data from the source image. In these embodiments, the dependency between Transfers G1' and H has been removed as well, so an edge in a dependency graph from vertex G1' to vertex H, can be deleted.

In scenario 300, computing device CD1 can topologically sort graph 900 to generate a list of vertices. The resulting list of vertices, shown in FIG. 9A as vertex list 920, can represents a sequence of all vertices in graph 900 ordered by ordering 850. Computing device CD1 can use vertex list 920 to order either vertices in graph 900 or corresponding transfers in a transfer list. As there is a one to one mapping of vertices in graph 900 and transfers; e.g., vertex A represents Transfer A, vertex B represents Transfer B, and so on; then, vertex list 920 can be used to order transfers in list L1 600, after Transfer G1 replaces Transfer G in list L1 600. As shown in FIG. 9A, vertex list 920 orders vertices (or transfers) as follows: A, B, D, C, E, F, G1, H, and I.

To break cycle 830 by reversing an edge representing ordering dependencies, left edge 832 of graph 840 can be reversed; that is, changed from an edge from vertex G to vertex E to a reversed edge from a vertex E2, representing Transfer E2 that replaces Transfer E, to a vertex G2, representing Transfer G2 that replaces Transfer G. Transfers E2 and G2 can be generated that have a reverse ordering dependency with respect to Transfer E and Transfer G. To produce correct output, Transfer E2 should precede Transfer G2, as Transfer E2 saves memory locations in temporary space that Transfer G2 expects to use. Then graph 840 can be updated to replace vertices E and G with vertices E2 and G2 and replace left edge 832 from G to E with a replacement edge from E2 to G2, breaking cycle 830.

Again, as discussed above in the context of FIG. 6, Transfers E and G perform the following actions:
  Diff Transfer E: read source data from locations 150 to 159, apply patch_P3oP1 to source data and obtain target data, write target data to locations 170 to 179
  Diff Transfer G: read source data from locations 170 to 184, apply patch_P2oP3 to source data and obtain target data, write target data to locations 160 to 169

For a replacement Transfer E2, contents of target locations of Transfer E, that is memory locations 170 to 179, can to be read in and those contents saved to temporary storage; e.g., storage suitable to store at least 10 memory locations called "T1". Then, Transfer E2 can carry out the procedures of Transfer E listed above. For a replacement Transfer G2, instead of reading source data from locations 170 to 184, temporary storage T1 can be appended with data from locations 180 to 184, then the source data can be read from T1 storing the contents of memory locations 170 to 184 instead from the source image. Then, Transfer G2 can carry out the remaining procedures of Transfer G listed above. In scenario 300, Transfer G2 is the only transfer utilizing the temporary storage for memory locations 170 to 184, so after reading source data from T1, Transfer G2 can free up storage for T1. Both Transfers E2 and G2 can remain as diff-type transfers.

Note that that the replacement Transfer G2 of scenario 300 reads locations 180 to 184 as part of appending data from those locations to T1. Thus, the ordering dependency between Transfers G2 and H is still present.

Then, the following Transfers E2 and G2 can replace respective Transfers E and G:
  Transfer E2: read data from locations 170 to 179, write data to temporary storage T1, perform a diff transfer by reading source data from image locations 150 to 159, applying patch_P3oP1 to source data thereby obtaining target data, writing target data to image locations 170 to 179
  Transfer G2: append data from locations 180 to 184 to temporary storage T1, read locations 0 to 14 of temporary storage T1 to obtain source data, apply patch_P2oP3 to the source data to obtain target data, write target data to image locations 160 to 169

In some embodiments, a Transfer E2' can read source data from all source locations of Transfer G, that is locations 170 to 184, into temporary storage T1, thereby removing the ordering dependency between a corresponding Transfer G2' and Transfer H, but replacing that ordering dependency with an ordering dependency between Transfers E2' and H and so leading to replacing the edge from vertex G2' to vertex H with an edge from vertex E2' to vertex H. In these embodiments, Transfer G2' would not append data from locations 180 to 184 to temporary storage T1, but otherwise would remain the same.

Figure 9B:
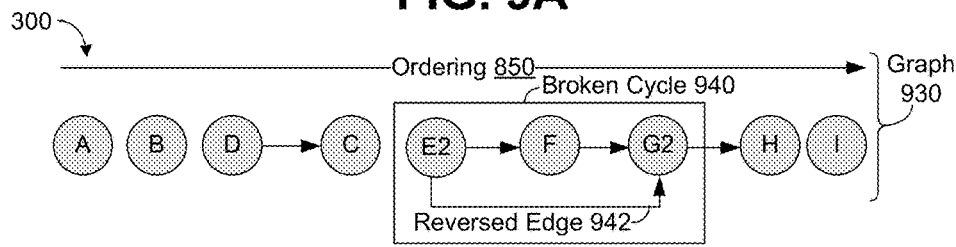
FIG. 9B depicts a revision of the graph of FIG. 8B due to cycle edge reversal and a transfer list, in accordance with an example embodiment.

FIG. 9B depicts graph 930, which is a revision of graph 840 by reversal of left edge 832 of cycle 830, and a corresponding vertex list 950, in accordance with an example embodiment. Graph 930 is based on graph 840, with vertices E and G replaced by respective vertices E2 and G2, where vertex E2 represents Transfer E2 discussed immediately above, and where vertex G2 represents Transfer G2 discussed immediately above. As Transfer E2 stored data in temporary storage that Transfer G2 uses as source data, Transfer E2 should take place before Transfer G2. Therefore, reversed edge 942 from vertex E2 to vertex G2 has been added to graph 930. Left edge 832 has been deleted from graph 930 of FIG. 9B, as the dependency from vertex G to vertex E is no longer present.

In scenario 300, computing device CD1 can topologically sort graph 930 to generate a list of vertices. The resulting list of vertices, shown in FIG. 9B as vertex list 950, can represents a sequence of all vertices in graph 930 ordered by ordering 850. Computing device CD1 can use vertex list 950 to order either vertices in graph 930 or corresponding transfers in a transfer list. As there is a one to one mapping of vertices in graph 930 and transfers; e.g., vertex A represents Transfer A, vertex B represents Transfer B, and so on; then, vertex list 950 can be used to order transfers in list L1 600, after Transfers E2 and G2 have replaced respective Transfers E and G in list L1 600. As shown in FIG. 9A, vertex list 950 orders vertices (or transfers) as follows: A, B, D, C, E2, F, G2, H, and I.

Figure 10:
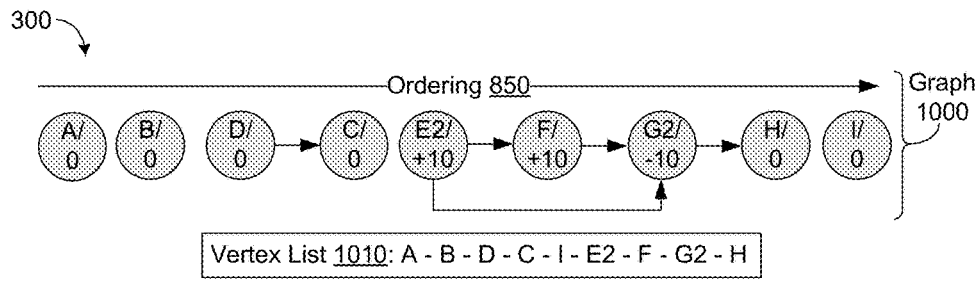
FIG. 10 depicts the graph of FIG. 9B with weighted vertices and a transfer list, in accordance with an example embodiment.

In scenario 300, computing device CD1 uses a graph with reversed edges; e.g., graph 940, for ordering transfers in an update package. FIG. 10 depicts graph 1000, which is graph 940 of FIG. 9B modified to have weighted vertices and a corresponding transfer list, in accordance with an example embodiment. Graph 1000 shows each vertex with a weight value indicating how much temporary storage is used to perform a corresponding transfer. For example, FIG. 10 shows Vertex A of graph 1000 as "A/0" to indicate the vertex has a name of "A" and a weight of "0", where a weight of 0 indicates no temporary storage is used by corresponding Transfer A. As another example, Vertex E2 of graph 1000 is shown as "E2/10" with a weight of "10" indicating ten units (locations,) of temporary storage is used by corresponding Transfer E2. In scenario 300, the units of storage used to weight vertices are locations—in other scenarios, other units of storage, such as bytes, or megabytes, can be used to weight vertices in a graph.

In scenario 300, computing device CD1 can use a greedy topological sort algorithm to select vertices from graph 1000 to add to a vertex list or for selecting corresponding transfers to add to a transfer list in an update package. When selecting vertices of graph 1000, computing device CD1 can choose as a next vertex Nmin that minimizes the temporary storage in use after a corresponding transfer Nmin executes. If there is a tie among vertices, the greedy topological sort algorithm can choose an arbitrary vertex to break the tie. Other techniques to obtain a vertex list based on graph 1000 are possible as well.

In scenario 300, computing device CD1 uses ordering 850 to break ties in selecting vertices. As shown in FIG. 10, computing device CD1 can select vertices for vertex list 1010 orders vertices as follows: A (with weight 0), B (with weight 0), D (with weight 0), C (with weight 0), I (with weight 0), E2 (with weight 10), F (with weight 10), G2 (with weight −10). Even though G2 has the lowest weight in graph 1000, G2 cannot be reached via topological sort until vertices both E2 and F have been reached, otherwise the ordering represented by vertex list 1010 would not represent a topological sort of graph 1000. Similarly, edge H with weight 0 cannot be reached until vertex G2 has been reached due to the ordering dependency between vertices G2 and H.

Figure 11:
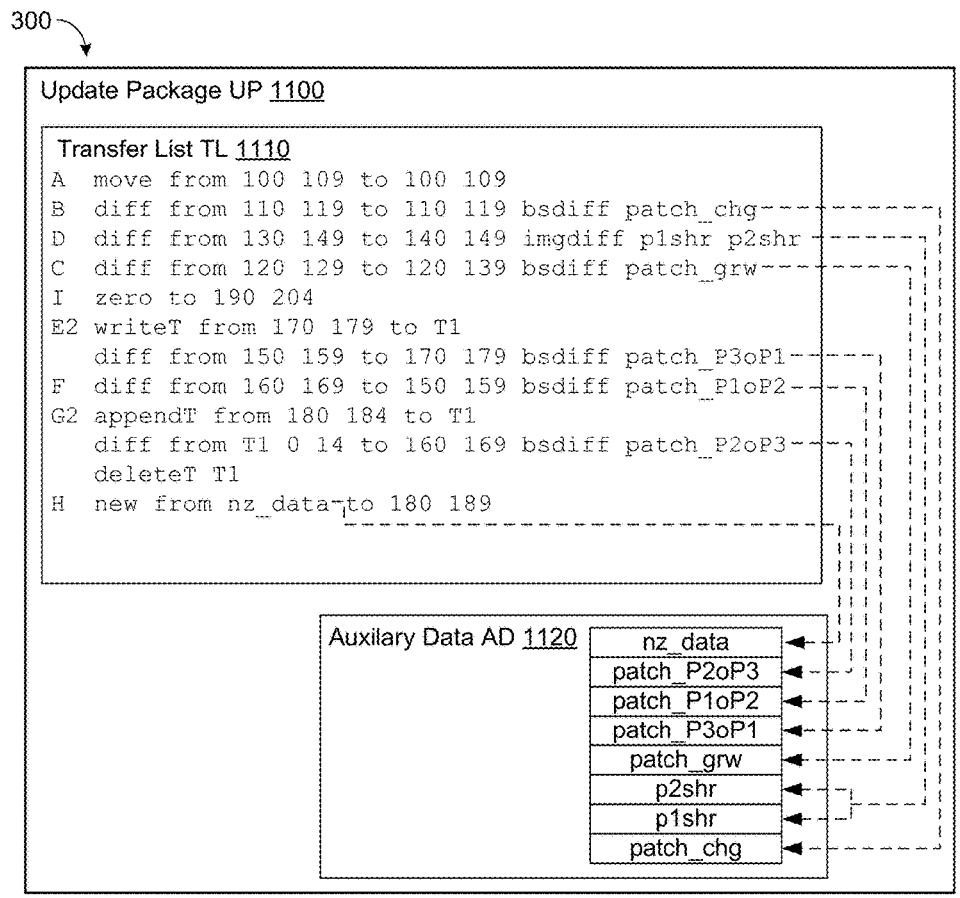
FIG. 11 shows an update package for the scenario, in accordance with an example embodiment.

In scenario 300, computing device CD1 can use vertex list 1010 to generate an update package. FIG. 11 shows an update package 1100 for scenario 300, in accordance with an example embodiment. Update package 1100 shows transfer list TL 1110 and auxiliary data 1120. Transfer list TL 1110 is a list of transfer ordered according to vertex list 1010; that is, vertex A is first in vertex list 1010 and corresponding Transfer A is first in transfer list TL 1110, vertex B is second in vertex list 1010 and corresponding Transfer B is second in transfer list TL 1110, and so on, until reaching a last vertex H in vertex list 1010 and corresponding last Transfer H in transfer list TL 1110. Several transfers in transfer list TL 1110 have references to auxiliary data 1020, with references from transfers to auxiliary data shown as dashed arrows in FIG. 10. For example, Transfer B in transfer list TL 1110 has a reference to auxiliary data 1120 labeled as "patch_chg" in both transfer list TL 1110 and auxiliary data 1120 of FIG. 11. FIG. 11 also shows that each of Transfers C, D, E2, F, G2, and H refers to a labeled portion of auxiliary data 1120.

Transfers A, B, C, D, F, H, and I in transfer list TL 1110 are configured to perform the operation discussed above in the context of list L1 600 and as shown in FIG. 6. Example transfers A, B, D, I, E2, G2, and H of transfer list TL 1110 of FIG. 11 are also shown in Table 1 below:

TABLE 1

| | |
|---|---|
| A | move from 100 109 to 100 109 |
| B | diff from 110 119 to 110 119 bsdiff patch_chg |
| D | diff from 130 149 to 140 149 imgdiff p1shr p2shr |
| I | zero to 190 204 |
| E2 | writeT from 170 179 to T1 |
| | diff from 150 159 to 170 179 bsdiff patch_P3oP1 |
| G2 | appendT from 180 184 to T1 |
| | diff from T1 0 14 to 160 169 bsdiff patch_P2oP3 |
| | deleteT T1 |
| H | new from nz_data to 180 189 |

In Table 1 and transfer list TL 1110 of FIG. 11, Transfer A is shown as a move transfer involving reading data from locations 100 to 109 of the (source) image and writing the read-in data to locations 100 to 109 in the (target) image. In other scenarios, an optimization of transfer list TL 1110 can exclude Transfer A, as the net effect of Transfer A during an in-place transfer is a null operation.

In Table 1 and transfer list TL 1110 of FIG. 11, Transfer B is shown as a diff transfer involving reading data from locations 110 to 119 of the (source) image as source data, applying auxiliary data "patch_chg" to the source data using the "bsdiff" patch-application tool to obtain target data, and writing the target data to locations 110 to 119 in the (target) image. Transfers C and F in transfer list TL 1010 are similar diff transfers that also utilize the bsdiff patch-application tool.

In Table 1 and transfer list TL 1110 of FIG. 11, Transfer D is shown as a diff transfer involving reading data from locations 130 to 139 of the (source) image as source data, applying auxiliary data "p1shr" and "p2shr" to the source data using the "imgdiff" patch-application tool to obtain target data, and writing the target data to locations 140 to 149 in the (target) image. In Table 1 and transfer list TL 1110 of FIG. 11, Transfer I is shown a zero operation involving writing patterns of zeroes as target data to locations 190 to 204 in the (target) image.

In Table 1 and transfer list TL 1110 of FIG. 11, Transfer E2 is shown beginning with a writeT operation to read the data in locations 170 to 179 of the (source) image as read-in data and write the read-in data to temporary storage named "T1". E2 concludes with a diff transfer to read locations 150 to 159 from the image as source data, use a "bsdiff" application to apply a patch "patch_P3oP1" to the source data and so generate target data, and then write the target data to locations 170 to 179 of the (target) image.

In Table 1 and transfer list TL 1110 of FIG. 11, Transfer G2 is shown with an appendT operation to read read-in data from locations 180 to 184 of the (source) image and append the read-in data to temporary storage T1, where T1 was initially written as part of transfer T1. After the appendT operation of scenario 300, T1 stores the pre-update contents of locations 170 to 184 of the image. Transfer G2 continues with a diffT transfer to read source data from locations 0 to 14 of T1, use the bsdiff patch-application tool to apply a patch "patch_P2oP3" to the source data to generate target data, and write the target data to (target) image locations 160 to 169. Then, Transfer G2 can finish with a "deleteT" operation to delete the T1 temporary storage utilized earlier in Transfers E2 and G2.

In other scenarios, the appendT operation of Transfer G2 can be removed, and the diff operation replaced with an example diff operation, such as:

diff from T1 0 9, image 180 184 to 160 169 bsdiff patch_P2oP3

In Table 1 and transfer list TL 1010 of FIG. 10, Transfer H is shown as a new transfer involving reading target data from auxiliary data "nz_data" and writing the target data to locations 180 to 189 in the (target) image. In some embodiments, one or more patch-application or other software tools can be utilized to obtain the target data from the auxiliary data; e.g., nz_data for Transfer H. In these embodiments, the patch-application or other software tool(s) can be specified as part of the transfer; e.g., if Transfer H had to utilize "tool1" to obtain target data from "nz_data", Transfer H could be specified as:

H new from tool1 nz_data to 180 189

After generating update package 1100, scenario 300 can continue with computing device CD1 sending, or otherwise communicating, update package 1100 to a second computing device CD2. Second computing device CD2 may or may not be computing device CD1. Once computing device CD1 has communicate update package 1100 to second computing device CD2, scenario 300 can be completed.

In some scenarios, second computing device CD2 can carry out the transfers listed in transfer list TL 1110 of update package 1100 to perform an in-place update of a copy of source image SI 500, perhaps resident on the second computing device, so that to source image SI 500 is updated to become a copy of target image TI 510. In some cases, second computing device CD2 can request that computing device CD1 send update package 1100. In other cases, computing device CD1 send update package 1100 without receiving a specific request from computing device CD2; e.g., computing device CD1 can send update packages periodically, can send update packages to a list of target devices that includes computing device CD2 upon generation of update package(s) and/or periodically.

Example Data Network

Figure 12:
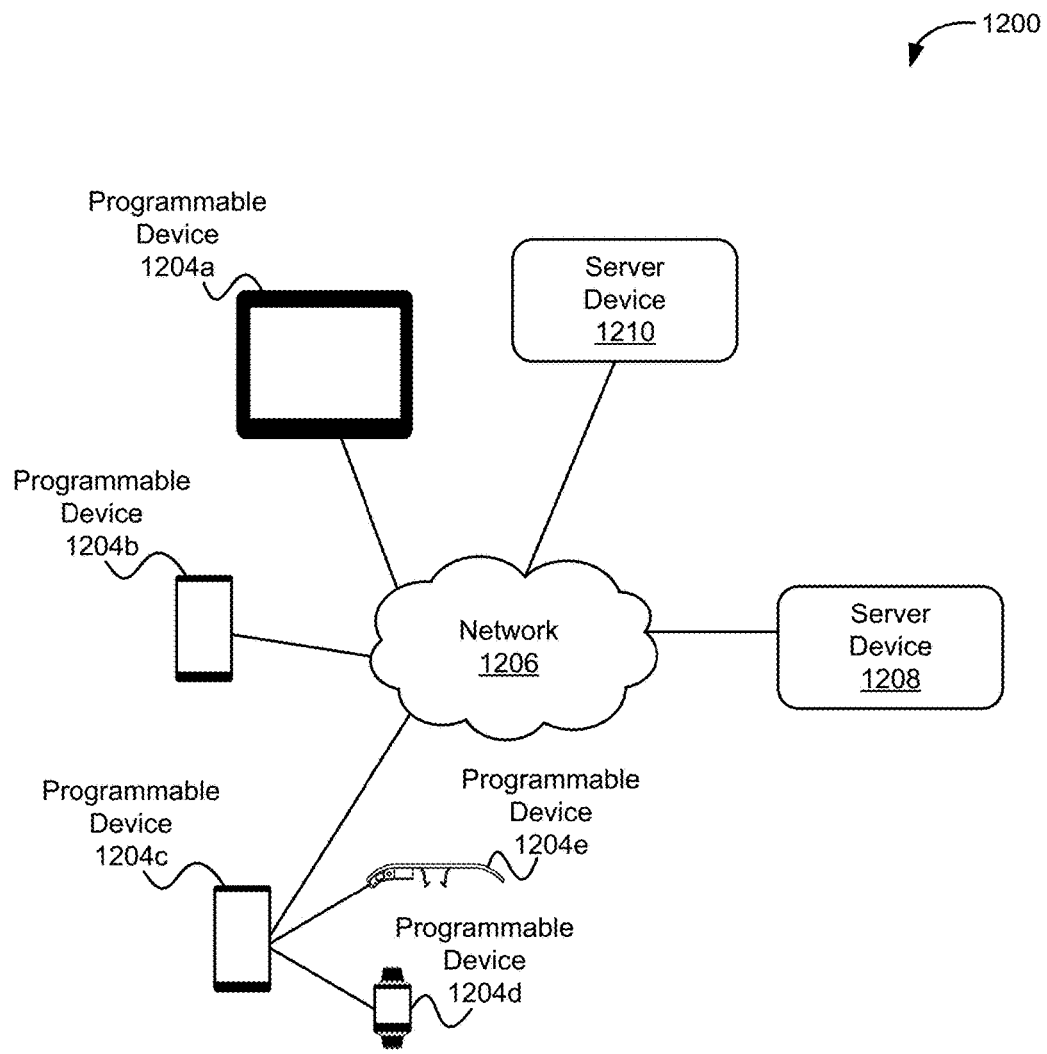
FIG. 12 depicts a distributed computing architecture, in accordance with an example embodiment.

FIG. 12 depicts a distributed computing architecture 1200 with server devices 1208, 1210 configured to communicate, via network 1206, with programmable devices 1204a, 1204b, 1204c, 1204d, and 1204e, in accordance with an example embodiment. Network 1206 may correspond to a LAN, a wide area network (WAN), a corporate intranet, the public Internet, or any other type of network configured to provide a communications path between networked computing devices. The network 1206 may also correspond to a combination of one or more LANs, WANs, corporate intranets, and/or the public Internet.

Although FIG. 12 only shows three programmable devices, distributed application architectures may serve tens, hundreds, or thousands of programmable devices. Moreover, programmable devices 1204a, 1204b, 1204c, 1204d, and 1204e (or any additional programmable devices) may be any sort of computing device, such as an ordinary laptop computer, desktop computer, wearable computing device, mobile computing device, head-mountable device (HMD), network terminal, wireless communication device (e.g., a cell phone or smart phone), and so on. In some embodiments, such as indicated with programmable devices 1204a, 1204b, and 1204c, programmable devices can be directly connected to network 1206. In other embodiments, such as indicated with programmable devices 1204d and 1204e, programmable devices can be indirectly connected to network 1206 via an associated computing device, such as programmable device 1204c. In this example, programmable device 1204c can act as associated computing device to pass electronic communications between programmable devices 1204d and 1204e and network 1206. In still other embodiments not shown in FIG. 12, a programmable device can be both directly and indirectly connected to network 1206.

Server devices 1208, 1210 can be configured to perform one or more services, as requested by programmable devices 1204a-1204e. For example, server device 1208 and/or 1210 can provide content to programmable devices 1204a-1204e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1208 and/or 1210 can provide programmable devices 1204a-1204e with access to software for database, search, computation, graphical, audio, video, World Wide Web/Internet utilization, and/or other functions. Many other examples of server devices are possible as well.

Computing Device Architecture

Figure 13A:
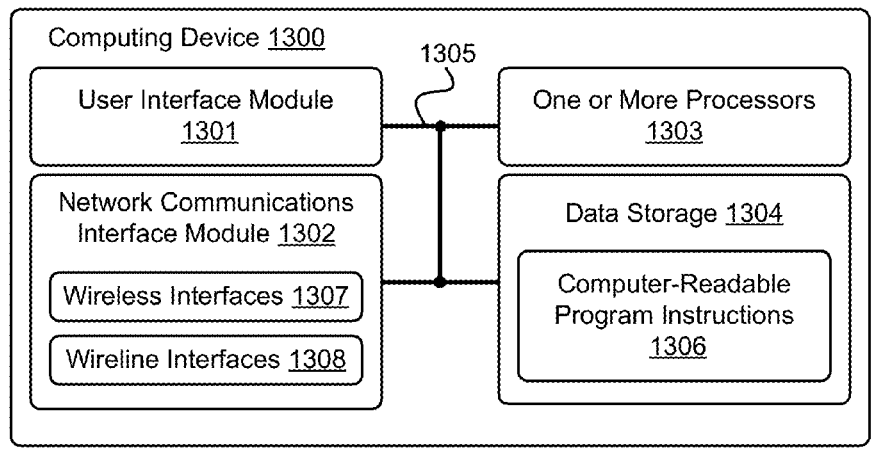
FIG. 13A is a block diagram of a computing device, in accordance with an example embodiment.

FIG. 13A is a block diagram of a computing device 1300 (e.g., system) in accordance with an example embodiment. In particular, computing device 1300 shown in FIG. 13A can be configured to perform one or more functions of software update build server 100, processors 102, data storage 104, update package generation module 110, software update distribution server 160, one or more of computing devices 170, CD1, and CD2, network 1206, server devices 1208, 1210, and/or one or more of programmable devices 1204a, 1204b, 1204c, 1204d, and 1204e, one or more of methods 200 and 1400, and one or more functions related to one or more of scenarios 150 and 300. Computing device 1300 may include a user interface module 1301, a network-communication interface module 1302, one or more processors 1303, and data storage 1304, all of which may be linked together via a system bus, network, or other connection mechanism 1305.

User interface module 1301 can be operable to send data to and/or receive data from external user input/output devices. For example, user interface module 1301 can be configured to send and/or receive data to and/or from user input devices such as a keyboard, a keypad, a touch screen, a computer mouse, a track ball, a joystick, a camera, a voice recognition module, and/or other similar devices. User interface module 1301 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 1301 can also be configured to generate audible output(s), such as a speaker, speaker jack, audio output port, audio output device, earphones, and/or other similar devices.

Network-communications interface module 1302 can include one or more wireless interfaces 1307 and/or one or more wireline interfaces 1308 that are configurable to communicate via a network, such as network 1206 shown in FIG. 12. Wireless interfaces 1307 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1308 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1302 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1303 can include one or more general purpose processors and/or one or more special purpose processors (e.g., digital signal processors, graphics processing units, application specific integrated circuits, etc.). Processors 1303 can be configured to execute computer-readable program instructions 1306 that are contained in the data storage 1304 and/or other instructions as described herein.

Data storage 1304 can include one or more computer-readable storage media that can be read and/or accessed by at least one of processors 1303. The one or more computer-readable storage media can include volatile and/or non-volatile storage components, such as optical, magnetic, organic or other memory or disc storage, which can be integrated in whole or in part with at least one of processors 1303. In some embodiments, data storage 1304 can be implemented using a single physical device (e.g., one optical, magnetic, organic or other memory or disc storage unit), while in other embodiments, data storage 1304 can be implemented using two or more physical devices.

Data storage 1304 can include computer-readable program instructions 1306 and perhaps additional data, such as but not limited to data used by one or more modules and/or other components of software update build server 100 and/or software update distribution server 160. In some embodiments, data storage 1304 can additionally include storage required to perform at least part of the methods and techniques and/or at least part of the functionality of the devices and networks; e.g., one or more images, such as one or more target images and/or one or more binary images, source file(s), source map(s), target file(s), target map(s), transfer(s), transfer list(s), auxiliary data, graph(s), and/or update package(s).

In some embodiments, computing device 1300 can include one or more sensors. The sensor(s) can be configured to measure conditions in an environment for computing device 1300 and provide data about that environment. The data can include, but is not limited to, location data about computing device 1300, velocity (speed, direction) data about computing device 1300, acceleration data about computing device, and other data about the environment for computing device 1300. The sensor(s) can include, but are not limited to, GPS sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 13B:
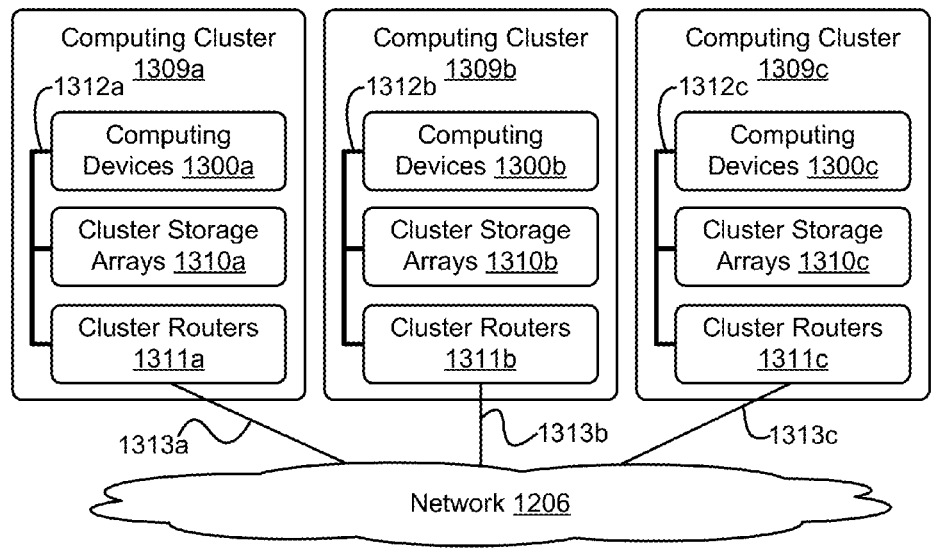
FIG. 13B depicts a cloud-based server system, in accordance with an example embodiment.

FIG. 13B depicts network 1206 of computing clusters 1309*a*, 1309*b*, 1309*c* arranged as a cloud-based server system in accordance with an example embodiment. Server devices 1208 and/or 1210 can be configured to perform some or all of the herein-described functionality of software update build server 100, software update distribution server 160, computing device 170, computing device CD1, computing device CD2, method 200, and/or method 1400. Some or all of the modules/components of server devices 1208 and/or 1210 can be cloud-based devices that store program logic and/or data of cloud-based applications and/or services. In some embodiments, server devices 1208 and/or 1210 can be on a single computing device residing in a single computing center. In other embodiments, server devices 1208 and/or 1210 can include multiple computing devices in a single computing center, or even multiple computing devices located in multiple computing centers located in diverse geographic locations. For example, FIG. 12 depicts each of server devices 1208 and 1210 residing in different physical locations.

In some embodiments, software and data associated with server devices 1208 and/or 1210 can be encoded as computer readable information stored in non-transitory, tangible computer readable media (or computer readable storage media) and accessible by one or more of programmable devices 1204*a*-1204*e* and/or other computing devices. In some embodiments, data associated with server devices 1208 and/or 1210 can be stored on a single disk drive or other tangible storage media, or can be implemented on multiple disk drives or other tangible storage media located at one or more diverse geographic locations.

FIG. 13B depicts a cloud-based server system in accordance with an example embodiment. In FIG. 13B, the functions of server devices 1208 and/or 1210 can be distributed among three computing clusters 1309*a*, 1309*b*, and 1308*c*. Computing cluster 1309*a* can include one or more computing devices 1300*a*, cluster storage arrays 1310*a*, and cluster routers 1311*a* connected by a local cluster network 1312*a*. Similarly, computing cluster 1309*b* can include one or more computing devices 1300*b*, cluster storage arrays 1310*b*, and cluster routers 1311*b* connected by a local cluster network 1312*b*. Likewise, computing cluster 1309*c* can include one or more computing devices 1300*c*, cluster storage arrays 1310*c*, and cluster routers 1311*c* connected by a local cluster network 1312*c*.

In some embodiments, each of the computing clusters 1309*a*, 1309*b*, and 1309*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1309*a*, for example, computing devices 1300*a* can be configured to perform various computing tasks of server devices 1208 and/or 1210. In one embodiment, the various functionalities of server devices 1208 and/or 1210 can be distributed among one or more of computing devices 1300*a*, 1300*b*, and 1300*c*. Computing devices 1300*b* and 1300*c* in computing clusters 1309*b* and 1309*c* can be configured similarly to computing devices 1300*a* in computing cluster 1309*a*. On the other hand, in some embodiments, computing devices 1300*a*, 1300*b*, and 1300*c* can be configured to perform different functions.

In some embodiments, computing tasks and stored data associated with server devices 1208 and/or 1210 be distributed across computing devices 1300*a*, 1300*b*, and 1300*c* based at least in part on the storage and/or processing requirements of some or all components/modules of server devices 1208 and/or 1210, the storage and/or processing capabilities of computing devices 1300*a*, 1300*b*, and 1300*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1310*a*, 1310*b*, and 1310*c* of the computing clusters 1309*a*, 1309*b*, and 1309*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 1208 and/or 1210 can be distributed across computing devices 1300*a*, 1300*b*, and 1300*c* of computing clusters 1309*a*, 1309*b*, and 1309*c*, various active portions and/or backup portions of data for these components can be distributed across cluster storage arrays 1310*a*, 1310*b*, and 1310*c*. For example, some cluster storage arrays can be configured to store the data of one or more modules/components of server devices 1208 and/or 1210, while other cluster storage arrays can store data of other modules/components of server devices 1208 and/or 1210. Additionally, some cluster storage arrays can be configured to store backup versions of data stored in other cluster storage arrays.

The cluster routers 1311a, 1311b, and 1311c in computing clusters 1309a, 1309b, and 1309c can include networking equipment configured to provide internal and external communications for the computing clusters. For example, the cluster routers 1311a in computing cluster 1309a can include one or more internet switching and routing devices configured to provide (i) local area network communications between the computing devices 1300a and the cluster storage arrays 1301a via the local cluster network 1312a, and (ii) wide area network communications between the computing cluster 1309a and the computing clusters 1309b and 1309c via the wide area network connection 1313a to network 1206. Cluster routers 1311b and 1311c can include network equipment similar to the cluster routers 1311a, and cluster routers 1311b and 1311c can perform similar networking functions for computing clusters 1309b and 1309b that cluster routers 1311a perform for computing cluster 1309a.

In some embodiments, the configuration of the cluster routers 1311a, 1311b, and 1311c can be based at least in part on the data communication requirements of the computing devices and cluster storage arrays, the data communications capabilities of the network equipment in the cluster routers 1311a, 1311b, and 1311c, the latency and throughput of local networks 1312a, 1312b, 1312c, the latency, throughput, and cost of wide area network links 1313a, 1313b, and 1313c, and/or other factors that can contribute to the cost, speed, fault-tolerance, resiliency, efficiency and/or other design goals of the moderation system architecture.

Example Operations

Figure 14:
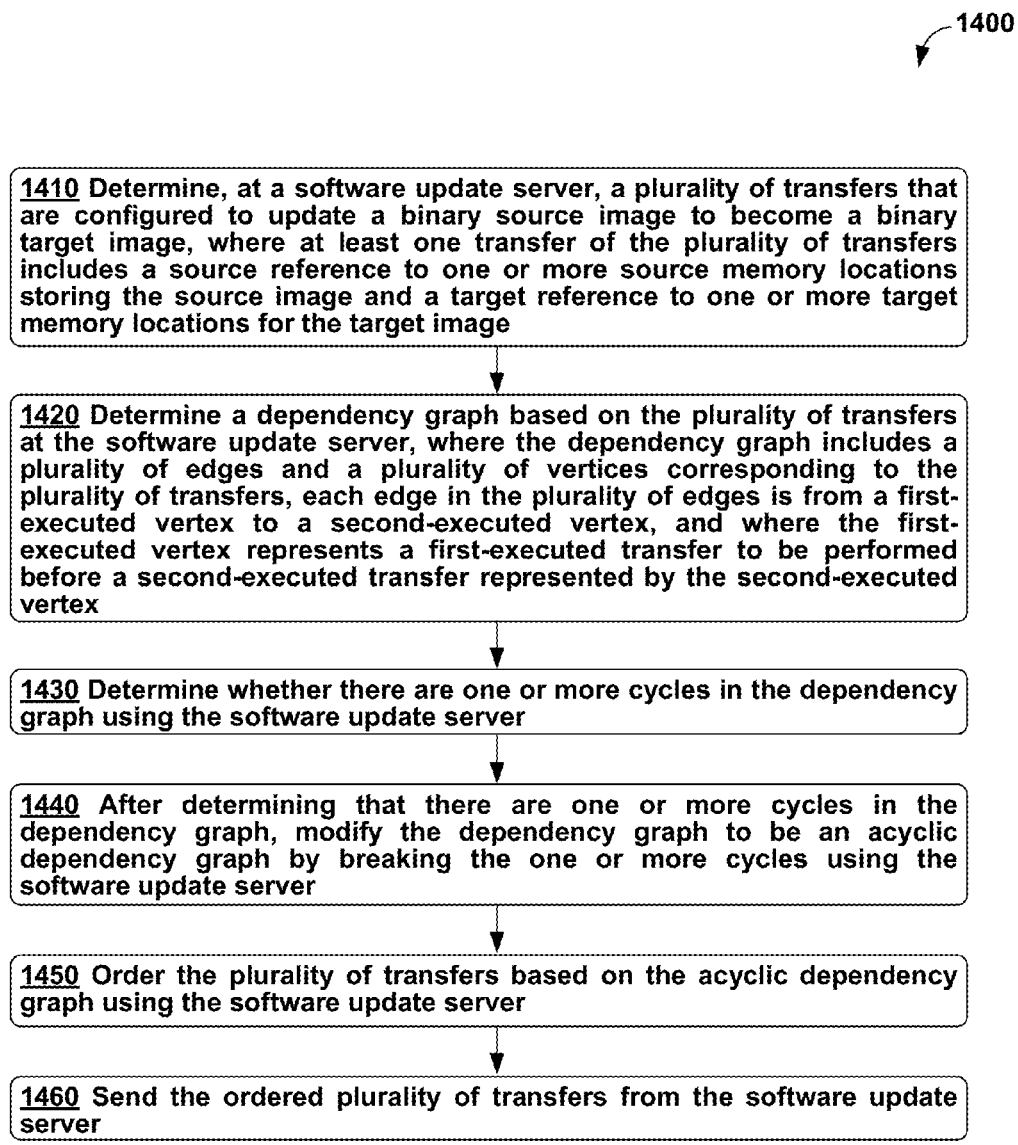
FIG. 14 is a flowchart of an example method, in accordance with an example embodiment.

FIG. 14 is a flowchart of method 1400, in accordance with an example embodiment. Method 1400 can be executed by one or more software update servers, such as software update build server 100 and/or software update distribution server 160, discussed above. The software update server can include a computing device, such as computing device 1300 discussed above at least in the context of at least FIGS. 13A and 13B.

Method 1400 can begin at block 1410, where the software update server can determine a plurality of transfers that are configured to update a binary source image to become a binary target image, as discussed above in the context of at least FIGS. 1A-11. At least one transfer of the plurality of transfers can include a source reference to one or more source memory locations storing the source image and a target reference to one or more target memory locations for the target image.

In some embodiments, the plurality of transfers can include a diff transfer. The diff transfer can be configured to read source data from the binary image based on the source reference of the diff transfer, apply auxiliary data associated with the diff transfer to the source data to obtain target data, and write the target data to the binary image based on the target reference of the diff transfer, such as discussed above in the context of at least FIGS. 2, 6, and 11.

In other embodiments, the plurality of transfers can include a move transfer. The move transfer can be configured to read source data from the binary image based on the source reference of the move transfer and write the source data to the binary image based on the target reference of the move transfer, such as discussed above in the context of at least FIGS. 2, 6, and 11.

In still other embodiments, the plurality of transfers can include a new transfer. The new transfer can be configured to read source data from auxiliary data associated with the new transfer and write the source data to the binary image based on the target reference of the new transfer, such as discussed above in the context of at least FIGS. 2, 6, and 11.

At block 1420, the software update server can determine a dependency graph based on the plurality of transfers, where the dependency graph can include a plurality of edges and a plurality of vertices corresponding to the plurality of transfers, where each edge in the plurality of edges can be from a first-executed vertex to a second-executed vertex, and where the first-executed vertex represents a first-executed transfer to be performed before a second-executed transfer represented by the second-executed vertex, as discussed above in the context of at least FIGS. 2-11.

In some embodiments, determining a dependency graph can include: determining a first transfer and a second transfer of the plurality of transfers, where the target reference of the second transfer refers to at least one memory location referred to by the source reference of the first transfer; determining a first vertex of the dependency graph corresponding to the first transfer; determining a second vertex of the dependency graph corresponding to the second transfer; and determining a first edge from the first vertex to the second vertex, as discussed above in the context of at least FIGS. 2, 6, and 7.

At block 1430, the software update server can determine whether there are one or more cycles in the dependency graph, as discussed above in the context of at least FIGS. 2-11.

At block 1440, the software update server can, after determining that there are one or more cycles in the dependency graph, modify the dependency graph to be an acyclic dependency graph by breaking the one or more cycles in the dependency graph as discussed above in the context of at least FIGS. 2-11.

In some embodiments, modifying the dependency graph to be the acyclic dependency graph by breaking the one or more cycles can include: selecting a particular edge in a particular cycle of the one or more cycles, where the particular edge is from a first cycle-vertex to a second cycle-vertex, where the first cycle-vertex is associated with a first cycle-transfer, and where the second cycle-vertex is associated with the second cycle-transfer; modifying at least one transfer of the first cycle-transfer and the second cycle-transfer; modifying at least one vertex of the first cycle-vertex and second cycle-vertex that is associated with the modified at least one transfer; and modifying the particular edge based on the modified at least one vertex to break the particular cycle, such as discussed above in the context of at least FIGS. 2, 9A, and 9B.

In particular embodiments, modifying the at least one transfer of the first cycle-transfer and the second cycle-transfer can include updating the source reference of the first cycle-transfer to no longer refer to at least one target location referred to by the target reference of the second cycle-transfer. Then, modifying the particular edge based on the modified at least one vertex to break the particular cycle can include removing the particular edge in the dependency graph such as discussed above in the context of at least FIGS. 2 and 9A.

In other particular embodiments, modifying the at least one transfer of the first cycle-transfer and the second cycle-transfer can include: updating the second cycle-transfer to at least: save, to a temporary storage location, a copy of contents of memory locations referred to by the target reference of the second cycle-transfer that overlap memory locations referred to by the source reference of the first cycle-transfer before writing to the at least one memory location referred to by the target reference of the second cycle-transfer; and updating the first cycle-transfer to at least: retrieve, from the temporary storage location, the copy of the contents of memory locations referred to by the target reference of the second cycle-transfer that overlap memory locations referred to by the source reference of the first cycle-transfer. Then, modifying the particular edge based on the modified at least one vertex to break the particular cycle can include reversing the particular edge in the dependency graph to go from the second cycle-vertex to the first cycle-vertex, such as discussed above in the context of at least FIGS. 2 and 9B.

At block 1450, the software update server can order the plurality of transfers based on the acyclic dependency graph as discussed above in the context of at least FIGS. 2-11.

In some embodiments, the plurality of vertices can include a weighted vertex that corresponds to a particular transfer, where the weighted vertex can have a weight that is based on an amount of temporary storage by the particular transfer. Then, ordering the plurality of transfers can include ordering the plurality of transfers based an amount of temporary storage utilized by each transfer, such as discussed above in the context of at least FIGS. 2 and 10. In particular embodiments, ordering the plurality of transfers based on the amount of temporary storage utilized by each transfer can include topologically sorting the dependency graph based on the amount of temporary storage utilized by each transfer, such as discussed above in the context of at least FIGS. 2 and 10.

At block 1460, the software update server can send the ordered plurality of transfers from the software update server as discussed above in the context of at least FIGS. 2-11.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   determining, at a software update server, a plurality of transfers that are configured to update a binary source image to become a binary target image, wherein at least one transfer of the plurality of transfers comprises a source reference to one or more source memory locations storing the binary source image and a target reference to one or more target memory locations for the binary target image;
   determining a dependency graph based on the plurality of transfers at the software update server, wherein the dependency graph comprises a plurality of edges and a plurality of vertices corresponding to the plurality of transfers, each edge in the plurality of edges is from a first-executed vertex to a second-executed vertex, and wherein the first-executed vertex represents a first-executed transfer to be performed before a second-executed transfer represented by the second-executed vertex;
   determining whether there are one or more cycles in the dependency graph using the software update server;
   after determining that there are one or more cycles in the dependency graph, modifying the dependency graph to be an acyclic dependency graph by breaking the one or more cycles using the software update server by at least:
   determining whether to break a first cycle of the one or more cycles either by reversing an edge of the first cycle or by removing an edge of the first cycle based on an amount of time to apply the plurality of transfers, and after determining to reverse an edge of the first cycle, reversing the edge of the first cycle based on a modified at least one vertex associated with the edge;

ordering the plurality of transfers based on the acyclic dependency graph using the software update server; and sending the ordered plurality of transfers from the software update server.

2. The method of claim 1, wherein determining the dependency graph comprises:

determining a first transfer and a second transfer of the plurality of transfers, wherein the target reference of the second transfer refers to at least one memory location referred to by the source reference of the first transfer;

determining a first vertex of the dependency graph corresponding to the first transfer;

determining a second vertex of the dependency graph corresponding to the second transfer; and determining a first edge from the first vertex to the second vertex.

3. The method of claim 1, wherein the one or more cycles comprise a second cycle, and wherein modifying the dependency graph to be the acyclic dependency graph by breaking the one or more cycles further comprises:

selecting a second edge in the second cycle, wherein the second edge is from a third vertex of the plurality of vertices to a fourth vertex of the plurality of vertices, wherein the third vertex is associated with a third transfer of the plurality of transfers, and wherein the fourth vertex is associated with a fourth transfer of the plurality of transfers;

modifying at least one transfer of the third transfer and the fourth transfer;

modifying at least one vertex of the third vertex and the fourth vertex that is associated with the modified at least one transfer; and modifying the second edge based on the modified at least one vertex to break the second cycle.

4. The method of claim 3, wherein modifying at least one transfer of the third transfer and the fourth transfer comprises updating a source reference of the third transfer to no longer refer to at least one target location referred to by the target reference of the fourth transfer, and wherein modifying the second edge based on the modified at least one vertex to break the second cycle comprises removing the second edge in the dependency graph.

5. The method of claim 1, wherein the plurality of transfers comprises a first transfer and a second transfer, and wherein modifying the dependency graph to be the acyclic dependency graph comprises modifying at least one transfer of the first transfer and the second transfer by at least:

updating the second transfer to at least: save, to a temporary storage location, a copy of contents of memory locations referred to by a target reference of the second transfer that overlap memory locations referred to by a source reference of the first transfer before writing to at least one memory location referred to by the target reference of the second transfer, and updating the first transfer to at least: retrieve, from the temporary storage location, the copy of the contents of memory locations referred to by the target reference of the second transfer that overlap memory locations referred to by the source reference of the first transfer.

6. The method of claim 1, wherein the plurality of vertices comprise a weighted vertex, wherein the weighted vertex corresponds to a particular transfer, wherein the weighted vertex has a weight that is based on an amount of temporary storage by the particular transfer, and wherein ordering the plurality of transfers comprises ordering the plurality of transfers based on an amount of temporary storage utilized by each transfer.

7. The method of claim 6, wherein ordering the plurality of transfers based on the amount of temporary storage utilized by each transfer comprises topologically sorting the dependency graph based on the amount of temporary storage utilized by each transfer.

8. The method of claim 1, wherein the plurality of transfers comprise a diff transfer; and wherein the diff transfer is configured to read source data from the binary source image based on the source reference of the diff transfer, apply auxiliary data associated with the diff transfer to the source data to obtain target data, and write the target data to the binary target image based on the target reference of the diff transfer.

9. The method of claim 1, wherein the plurality of transfers comprise a move transfer; and wherein the move transfer is configured to read source data from the binary source image based on the source reference of the move transfer and write the source data to the binary target image based on the target reference of the move transfer.

10. The method of claim 1, wherein the plurality of transfers comprise a new transfer; and wherein the new transfer is configured to read source data from auxiliary data associated with the new transfer and write the source data to the binary target image based on the target reference of the new transfer.

11. A software update server, comprising:

one or more hardware processors; and data storage, configured to store at least computer-readable program instructions, wherein the instructions are configured to, upon execution by the one or more processors, cause the software update server to perform functions comprising:

determining a plurality of transfers that are configured to update a binary source image to become a binary target image, wherein at least one transfer of the plurality of transfers comprises a source reference to one or more source memory locations storing the binary source image and a target reference to one or more target memory locations for the binary target image;

determining a dependency graph based on the plurality of transfers, wherein the dependency graph comprises a plurality of edges and a plurality of vertices corresponding to the plurality of transfers, each edge in the plurality of edges is from a first-executed vertex to a second-executed vertex, and wherein the first-executed vertex represents a first-executed transfer to be performed before a second-executed transfer represented by the second-executed vertex;

determining whether there are one or more cycles in the dependency graph;

after determining that there are one or more cycles in the dependency graph, modifying the dependency graph to be an acyclic dependency graph by breaking the one or more cycles by at least:

determining whether to break a first cycle of the one or more cycles either by reversing an edge of the first cycle or by removing an edge of the first cycle based on an amount of time to apply the plurality of transfers, and after determining to reverse an edge of the first cycle, reversing the edge of the first cycle based on a modified at least one vertex associated with the edge;

ordering the plurality of transfers based on the acyclic dependency graph; and sending the ordered plurality of transfers.

12. The software update server of claim 11, wherein determining the dependency graph comprises:

determining a first transfer and a second transfer of the plurality of transfers, wherein the target reference of the second transfer refers to at least one memory location referred to by the source reference of the first transfer;

determining a first vertex of the dependency graph corresponding to the first transfer;

determining a second vertex of the dependency graph corresponding to the second transfer; and determining a first edge from the first vertex to the second vertex.

13. The software update server of claim 11, wherein the one or more cycles comprise a second cycle, and wherein modifying the dependency graph to be the acyclic dependency graph by breaking the one or more cycles further comprises:

selecting a second edge in the second cycle, wherein the second edge is from a third vertex of the plurality of vertices to a fourth vertex of the plurality of vertices, wherein the third vertex is associated with a third transfer of the plurality of transfers, and wherein the fourth vertex is associated with a fourth transfer of the plurality of transfers;

modifying at least one transfer of the third transfer and the fourth transfer;

modifying at least one vertex of the third vertex and the fourth vertex that is associated with the modified at least one transfer; and modifying the second edge based on the modified at least one vertex to break the second cycle.

14. The software update server of claim 13, wherein modifying at least one transfer of the third transfer and the fourth transfer comprises updating a source reference of the third transfer to no longer refer to at least one target location referred to by the target reference of the fourth transfer, and wherein modifying the second edge based on the second modified at least one vertex to break the second cycle comprises removing the second edge in the dependency graph.

15. The software update server of claim 13, wherein the plurality of transfers comprises a first transfer and a second transfer, and wherein modifying the dependency graph to be the acyclic dependency graph comprises modifying at least one transfer of the first transfer and the second transfer by at least:

updating the second transfer to at least: save, to a temporary storage location, a copy of contents of memory locations referred to by the target reference of the second transfer that overlap memory locations referred to by the source reference of the first transfer before writing to at least one memory location referred to by the target reference of the second transfer, and updating the first transfer to at least: retrieve, from the temporary storage location, the copy of the contents of memory locations referred to by the target reference of the second transfer that overlap memory locations referred to by the source reference of the first transfer.

16. The software update server of claim 11, wherein the plurality of vertices comprise a weighted vertex, wherein the weighted vertex corresponds to a particular transfer, and wherein the weighted vertex has a weight that is based on an amount of temporary storage by the particular transfer, and wherein ordering the plurality of transfers comprises ordering the plurality of transfers based on an amount of temporary storage utilized by each transfer.

17. The software update server of claim 16, wherein ordering the plurality of transfers based on the amount of temporary storage utilized by each transfer comprises topologically sorting the dependency graph based on the amount of temporary storage utilized by each transfer.

18. The software update server of claim 11, wherein the plurality of transfers comprise at least one of a diff transfer, a move transfer, and a new transfer;

wherein the diff transfer is configured to read source data from the binary source image based on the source reference of the diff transfer, apply auxiliary data associated with the diff transfer to the source data to obtain target data, and write the target data to the binary target image based on the target reference of the diff transfer;

wherein the move transfer is configured to read source data from the binary source image based on the source reference of the move transfer and write the source data to the binary target image based on the target reference of the move transfer; and wherein the new transfer is configured to read source data from auxiliary data associated with the new transfer and write the source data to the binary target image based on the target reference of the new transfer.

19. An article of manufacture including a non-transitory computer-readable storage medium having instructions stored thereon that, in response to execution by one or more hardware processors of a software update server, cause the software update server to perform functions comprising:

determining a plurality of transfers that are configured to update a binary source image to become a binary target image, wherein at least one transfer of the plurality of transfers comprises a source reference to one or more source memory locations storing the binary source image and a target reference to one or more target memory locations for the binary target image;

determining a dependency graph based on the plurality of transfers, wherein the dependency graph comprises a plurality of edges and a plurality of vertices corresponding to the plurality of transfers, each edge in the plurality of edges is from a first-executed vertex to a second-executed vertex, and wherein the first-executed vertex represents a first-executed transfer to be performed before a second-executed transfer represented by the second-executed vertex;

determining whether there are one or more cycles in the dependency graph;

after determining that there are one or more cycles in the dependency graph, modifying the dependency graph to be an acyclic dependency graph by breaking the one or more cycles by at least:

determining whether to break a first cycle of the one or more cycles either by reversing an edge of the first cycle or by removing an edge of the first cycle based on an amount of time to apply the plurality of transfers, and after determining to reverse an edge of the first cycle, reversing the edge of the first cycle based on a modified at least one vertex associated with the edge;

ordering the plurality of transfers based on the acyclic dependency graph; and sending the ordered plurality of transfers.

20. The article of manufacture of claim 19, wherein determining the dependency graph comprises:

determining a first transfer and a second transfer of the plurality of transfers, wherein the target reference of the second transfer refers to at least one memory location referred to by the source reference of the first transfer;

determining a first vertex of the dependency graph corresponding to the first transfer;

determining a second vertex of the dependency graph corresponding to the second transfer; and determining a first edge from the first vertex to the second vertex.

* * * * *